United States Patent
Nagata

(10) Patent No.: US 8,120,818 B2
(45) Date of Patent: Feb. 21, 2012

(54) IMAGE PROCESSING APPARATUS AND COMPUTER-READABLE STORAGE MEDIUM THAT ADD MARKING TYPE INFORMATION TO PREDETERMINED IMAGE

(75) Inventor: Tadashi Nagata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 526 days.

(21) Appl. No.: 12/257,450

(22) Filed: Oct. 24, 2008

(65) Prior Publication Data

US 2009/0109458 A1 Apr. 30, 2009

(30) Foreign Application Priority Data

Oct. 31, 2007 (JP) .................................. 2007-284200

(51) Int. Cl.
*H04N 1/40* (2006.01)
(52) U.S. Cl. ....... 358/3.28; 358/540; 358/1.9; 358/1.18; 382/100; 382/284
(58) Field of Classification Search .................... None
See application file for complete search history.

(56) References Cited

U.S. PATENT DOCUMENTS

| | | | | |
|---|---|---|---|---|
| 7,599,078 B2* | 10/2009 | Sano | ............................ | 358/1.13 |
| 7,619,782 B2* | 11/2009 | Mikami | ....................... | 358/3.28 |
| 7,755,786 B2* | 7/2010 | Foehr et al. | .................... | 358/1.15 |
| 2003/0063313 A1* | 4/2003 | Ito | .................................. | 358/1.15 |
| 2004/0032611 A1* | 2/2004 | Daly et al. | ...................... | 358/1.13 |
| 2006/0067759 A1* | 3/2006 | Osaka | ............................ | 399/366 |
| 2006/0126095 A1* | 6/2006 | Tamura et al. | ................ | 358/1.14 |
| 2006/0139673 A1* | 6/2006 | Sedky et al. | .................. | 358/1.13 |
| 2006/0158688 A1* | 7/2006 | Mori | ............................. | 358/1.15 |
| 2007/0258098 A1* | 11/2007 | Matsushima | ................... | 358/1.1 |
| 2008/0225310 A1* | 9/2008 | Huang | ............................ | 358/1.9 |

FOREIGN PATENT DOCUMENTS

| | | |
|---|---|---|
| JP | 3679349 | 8/2005 |
| JP | 2006-080939 | 3/2006 |
| JP | 2007-325251 | 12/2007 |

* cited by examiner

*Primary Examiner* — King Poon
*Assistant Examiner* — Dung Tran
(74) *Attorney, Agent, or Firm* — IPUSA, PLLC

(57) ABSTRACT

An image processing apparatus includes an input part to input data which is a target of an image processing, an output part to output a result of the image processing, a first filter to control an input process of data from the input part depending on the input part, and a second filter to control an output of data to the output part depending on the output part. A marking type information which is to be added to a predetermined image is specified with respect to the second filter, a marking image is created based on the marking type information, and the marking image is synthesized with respect to an image which is output from the output service. The second filter instructs output of an image with respect to the output service. An application is formed by connecting the first filter and the second filter.

15 Claims, 25 Drawing Sheets

FIG.6

| FUNCTION | COMBINATION OF FILTERS |
|---|---|
| COPY | READ + (DOCUMENT PROCESSING+) PRINT |
| PRINTER | PC DOCUMENT RECEPTION + DOCUMENT CONVERSION + PRINT |
| SCAN TO EMAIL | READ + MAIL TRANSMISSION |
| FAX TRANSMISSION | READ + FAX TRANSMISSION |
| FAX RECEPTION | FAX RECEPTION + PRINT |
| DOCUMENT BOX STORAGE | READ + STORED DOCUMENT REGISTRATION |
| DOCUMENT BOX PRINT | STORED DOCUMENT READ + PRINT |

FIG.11

| FILTER (LEFT) | FILTER (RIGHT) | PIPE |
|---|---|---|
| READ | PRINT | DMA PIPE |
| PC DOCUMENT RECEPTION | DOCUMENT CONVERSION | SPOOL PIPE |
| DOCUMENT CONVERSION | PRINT | DMA PIPE |
| * | * | GENERAL-PURPOSE MEMORY PIPE |

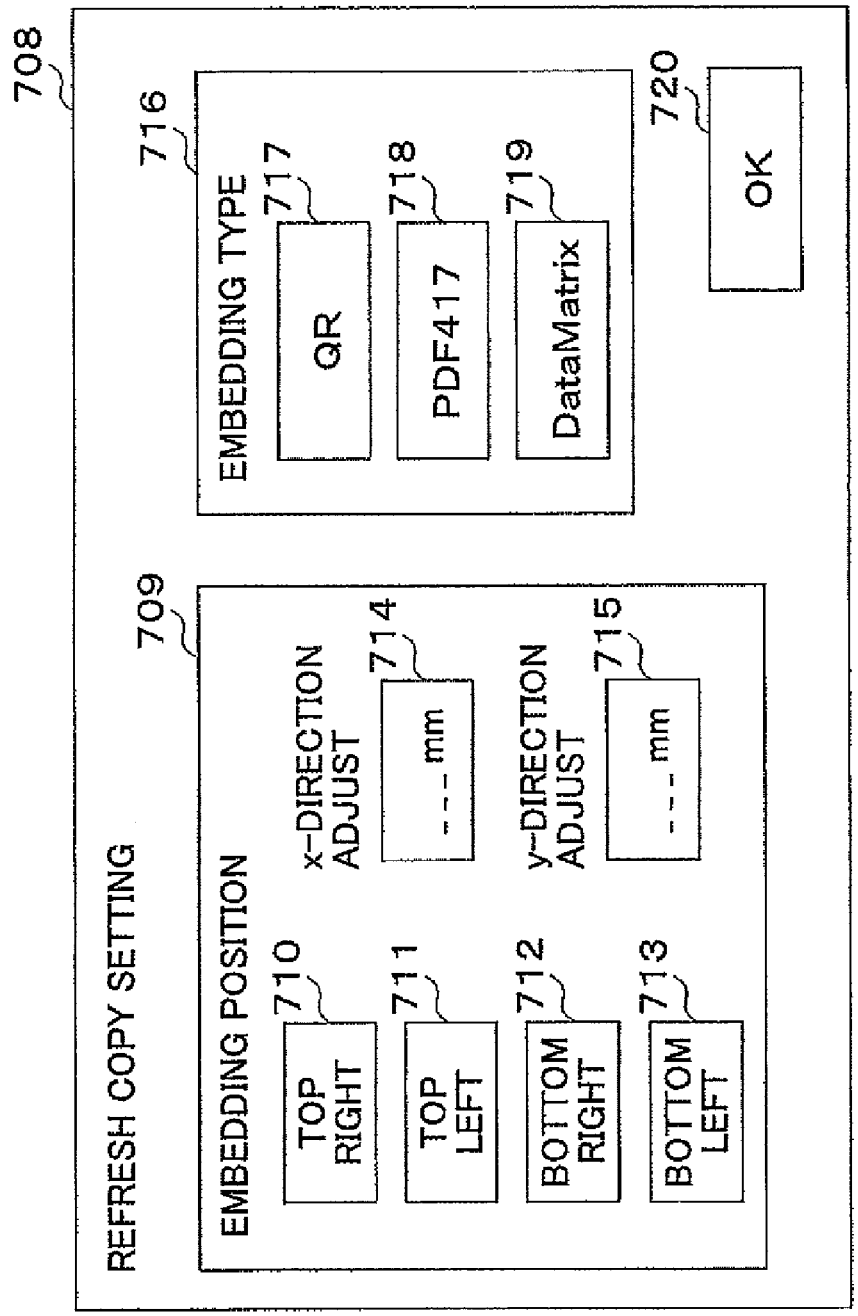

FIG.17

| MARKING SETTING INFO | |
|---|---|
| ATTRIBUTE | ATTRIBUTE VALUE |
| MARKING TYPE | NO EMBEDDING / UNAUTHORIZED COPY GUARD / REFRESH COPY / SECURITY TRACE |
| EMBEDDING POSITION | TOP RIGHT / TOP LEFT / BOTTOM RIGHT / BOTTOM LEFT / x-DIRECTION ADJUST / y-DIRECTION ADJUST |
| EMBEDDING TYPE (BAR CODE TYPE) | QR / PDF417 / DataMatrix |

FIG.18

| INITIAL SETTING \ USER SETTING | REFRESH COPY | UNAUTHORIZED COPY GUARD | SECURITY TRACE | NO EMBEDDING |
|---|---|---|---|---|
| REFRESH COPY | REFRESH COPY | REFRESH COPY | REFRESH COPY | REFRESH COPY |
| UNAUTHORIZED COPY GUARD | UNAUTHORIZED COPY GUARD | UNAUTHORIZED COPY GUARD | UNAUTHORIZED COPY GUARD | UNAUTHORIZED COPY GUARD |
| SECURITY TRACE | SECURITY TRACE | SECURITY TRACE | SECURITY TRACE | SECURITY TRACE |
| NO EMBEDDING | REFRESH COPY | UNAUTHORIZED COPY GUARD | SECURITY TRACE | NO EMBEDDING |

FIG.19

| MARKING TYPE | EMBEDDING METHOD |
|---|---|
| REFRESH COPY | ONLY 1 PAGE |
| UNAUTHORIZED COPY GUARD | ALL PAGES |
| SECURITY TRACE | ALL PAGES |
| NO EMBEDDING | NONE |

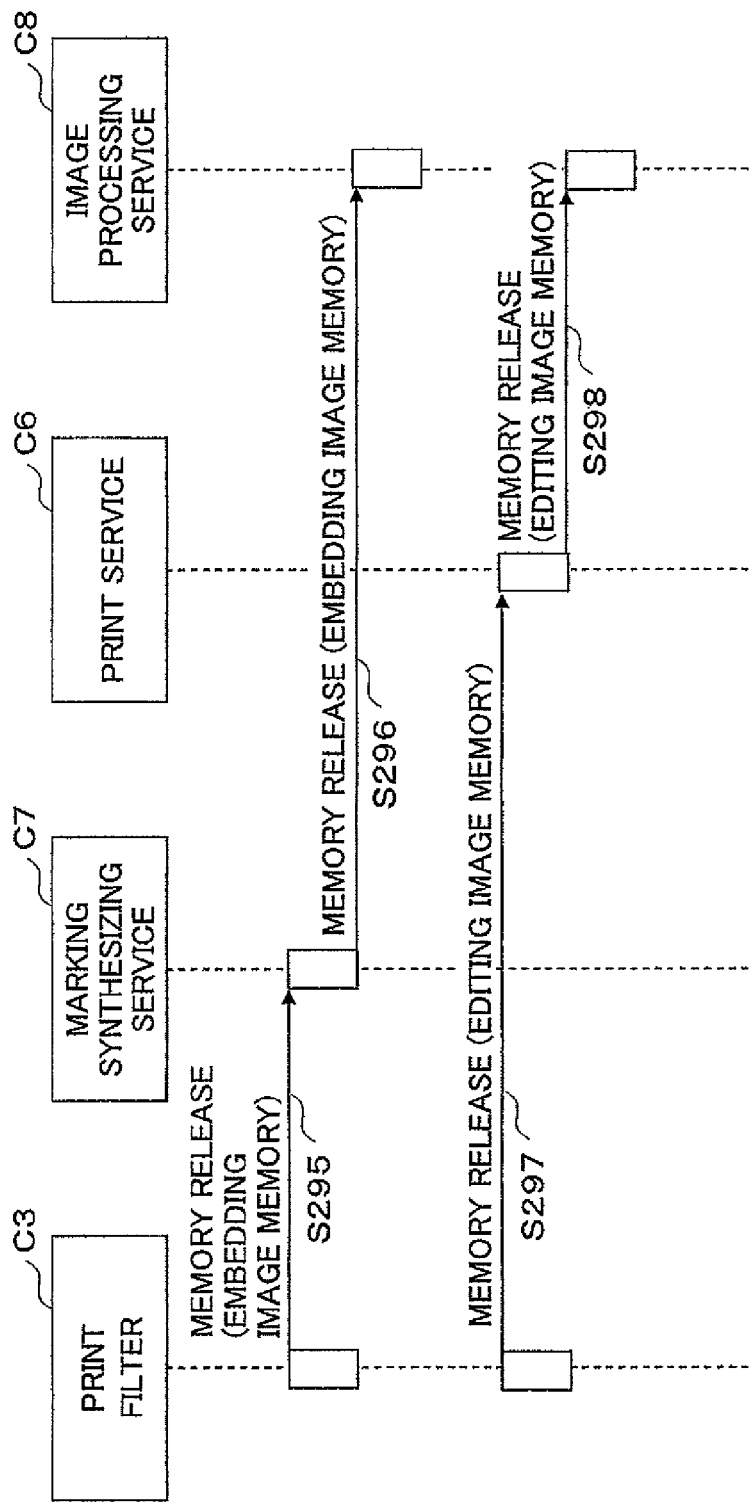

IMAGE PROCESSING APPARATUS AND COMPUTER-READABLE STORAGE MEDIUM THAT ADD MARKING TYPE INFORMATION TO PREDETERMINED IMAGE

BACKGROUND OF THE INVENTION

1. Field of the Invention

The present invention generally relates to image processing apparatuses and application executing methods, and more particularly to an image processing apparatus having a plurality of types of input parts for inputting data that is a target of an image processing and a plurality of types of output parts for outputting a result of the image processing, and to an application executing method therefor.

2. Description of the Related Art

Recently, in image processing apparatuses such as printers, copying apparatuses, scanners, facsimile apparatuses and Multi Function Peripherals (MFPs) which perform functions of a plurality of such apparatuses in a single unit, the memory space is limited but a Central Processing Unit (CPU) is provided similarly to a general-purpose computer in order to perform various functions under the control of applications (or application programs).

For example, an image processing apparatus proposed in a Japanese Patent No. 3679349 is provided with a platform of the function which is used in common by a plurality of applications. The application can be implemented by using an Application Program Interface (API) of the platform. According to the proposed image processing apparatus, it is possible to avoid implementing the same function a plurality of times among the applications because the function which is used in common by the plurality of applications is provided as the platform. As a result, it is possible to improve the efficiency with which the applications are developed as a whole.

But in general, in the case of the platform which is used in common and is provided with the API, the efficiency of developing the application may not be improved to an expected level if the granularity of the interface or the function provided by the platform is not designed appropriately.

For example, if the granularity is too small, the API may be called a large number of times even though the application only provides a simple service, and the source code will become complex.

On the other hand, if the granularity is too large, it is necessary to internally modify the platform in a case where the application to be implemented provides a service which is added with a modification to a portion of the functions provided by a certain interface, and the number of developing processes may consequently be increased. Particularly in a case where the modules within the platform have a strong dependency relationship with each other, the situation becomes complex because it is not only necessary to add new functions to the platform but it may also be necessary to correct an existing portion.

In addition, when implementing an application which modified a portion (for example, an image input process) of the service provided by the existing application, it is not possible to call the existing application with respect to the portions other than the modified portion. Accordingly, it is necessary to implement a new application by newly writing the source code.

SUMMARY OF THE INVENTION

Accordingly, it is a general object of the present invention to provide a novel and useful image processing apparatus and application executing method, in which the problems described above are suppressed.

Another and more specific object of the present invention is to provide an image processing apparatus and an application executing method which can simplify the customizing, expansion and the like of the functions.

Another specific object of the present invention is to provide an image processing apparatus and an application executing method which can add new marking information without making considerable modifications to an existing output component, when making various types of marking and synthesizing the new marking information at the time of outputting images on a recording medium such a paper.

Still another object of the present invention is to provide an image processing apparatus comprising one or a plurality of input parts configured to input data which is a target of an image processing; one or a plurality of output parts configured to output a result of the image processing; a first filter configured to control an input process of data from the input part depending on the input part; a second filter configured to control an output of data to the output part depending on the output part; a marking type specifying unit configured to specify marking type information which is to be added to a predetermined image, with respect to the second filter; a marking synthesizing service including a creating unit configured to create a marking image based on the marking type information which is notified thereto; an output service including an output unit configured to synthesize the marking image created by the marking synthesizing service with respect to an image which is output from the output service, and outputting a synthesized image; a notifying unit, within the second filter, configured to notify the marking type information input thereto to the marking synthesizing service; and an image output instructing unit, within the second filter, configured to instruct output of an image with respect to the output service, wherein an application is formed by connecting the first filter and the second filter.

A further object of the present invention is to provide an application executing method to be implemented in a computer of an image processing apparatus comprising one or a plurality of input parts inputting data which is a target of an image processing, one or a plurality of output parts outputting a result of the image processing, a first filter controlling an input process of data from the input part depending on the input part; and a second filter controlling an output of data to the output part depending on the output part, wherein an application is formed by connecting the first filter and the second filter, said application executing method comprising specifying, from a marking type specifying part, marking type information which is to be added to a predetermined image with respect to the second filter; notifying, from the second filter, the specified marking type information to a marking synthesizing service; creating, in the marking synthesizing service, a marking image based on the notified marking type information; instructing, from the second filter, output of an image with respect to an output service; and synthesizing, in the output service, the marking image created by the marking synthesizing service with respect to the image to be output, and outputting a synthesized image.

According to one aspect of the present invention, it is possible to simplify the customizing, expansion and the like of the functions.

According to another aspect of the present invention, it is possible to add new marking information without making considerable modifications to an existing output component, when making various types of marking and synthesizing the new marking information at the time of outputting images on a recording medium such a paper.

Other objects and further features of the present invention will be apparent from the following detailed description when read in conjunction with the accompanying drawings.

BRIEF DESCRIPTION OF THE DRAWINGS

FIG. 6 is a diagram showing an example of a combination of filters for performing the functions of the MFP;

FIG. 11 is a diagram showing an example of a correspondence table of the filters and pipes;

FIGS. 15A and 15B are diagrams showing examples of a marking condition setting screen;

FIG. 17 is a diagram showing an example of marking setting information stored in a setting information service as an initial setting;

FIG. 18 is a diagram showing an example of a marking condition determination rule;

FIG. 19 is a diagram showing an example of an embedding method which is returned from a marking synthesizing service;

FIG. 25 is a sequence diagram showing an example of a memory release process.

DESCRIPTION OF THE PREFERRED EMBODIMENTS

Figure 1:
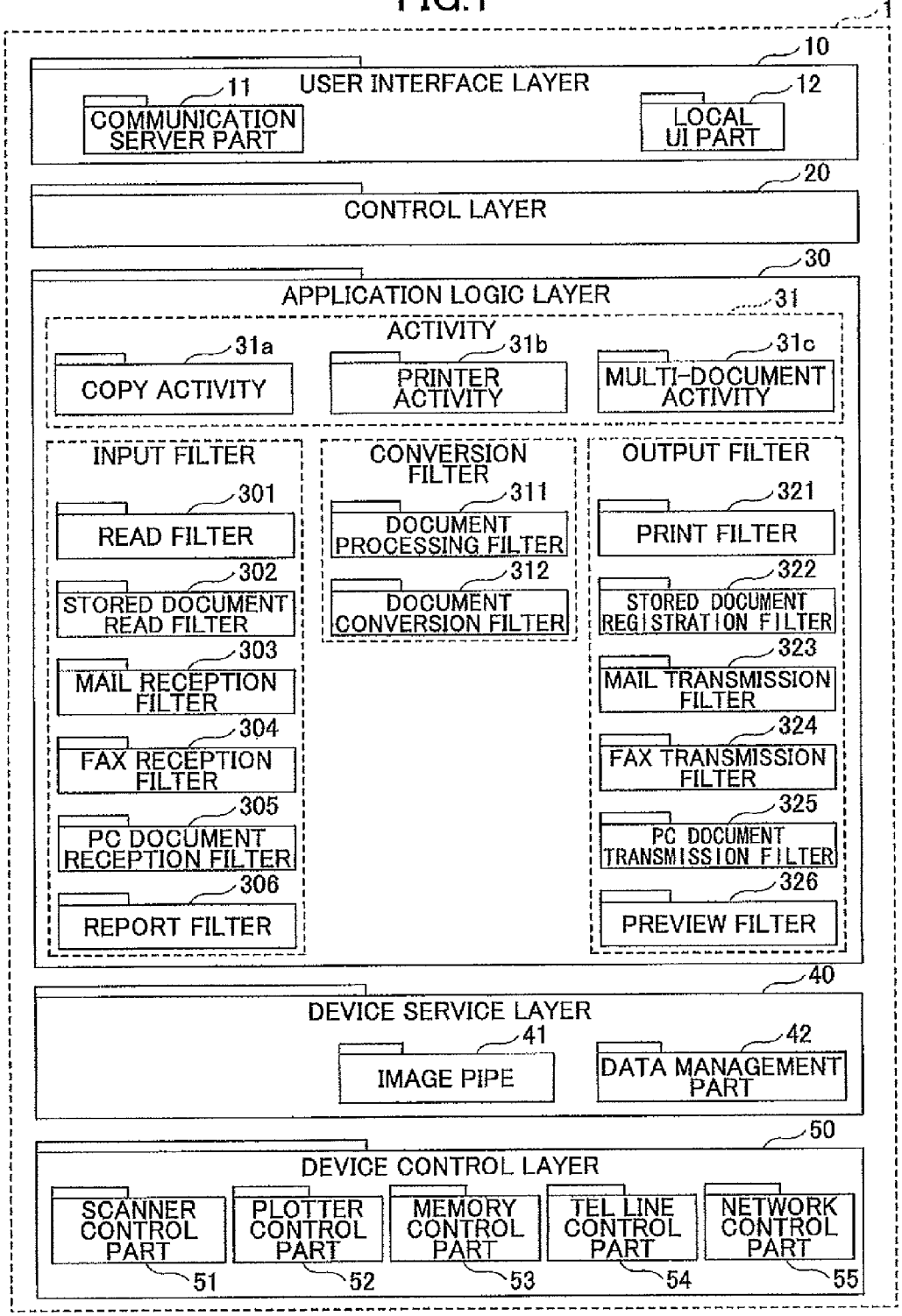
FIG. 1 is a block diagram showing a software structure of a MFP in a first embodiment of the present invention.

A description will be given of embodiments of the present invention, by referring to the drawings.

First Embodiment

FIG. 1 is a block diagram showing a software structure of a MFP in a first embodiment of the present invention The MFP is an image processing apparatus which performs a plurality of functions of a printer, a copying apparatus, a scanner, a facsimile apparatus and the like in a single unit.

As shown in FIG. 1, the software of the MFP 1 is formed by a user interface layer 10, a control layer 20, an application logic layer 30, a device service layer 40, and a device control layer 50. The hierarchical relationship of the layers shown in FIG. 1 is based on the call relationship among the layers. In other words, the upper layer in FIG. 1 basically calls the lower layer.

The user interface layer 10 is implemented with the function of accepting execution requests of functions such as copy, print, scan and facsimile transmission. For example, the user interface 10 includes a communication server part 11, a local User Interface (UI) part 12, and the like. For example, the communication server part 11 accepts the request from a client Personal Computer (PC) or the like (not shown) via a network. The local UI part 12 accepts the request which is input from an operation panel (not shown), for example. The request accepted by the user interface layer 10 is transferred to the control layer 20.

The control layer 20 is implemented with the function of controlling the process for performing the requested function. More particularly, the control layer 20 connects filters in the application logic layer 30 depending on the requested function, and controls execution of the function based on the connected filters. In this embodiment, "the function of the MFP 1" has the same meaning as one unit of service (from the input of the request until the final output is obtained) that is provided by the MFP 1 with respect to the user, and has the same meaning as the application which provides one unit of service from the software point of view.

The application logic layer 30 is implemented with a part group which is a group of parts respectively performing portions of the functions provided by the MFP 1. In other words, one function is performed by combining the parts in the application logic layer 30. Each part will be referred to as a "filter", because the software architecture of the MFP 1 is based on the "pipe and filter" concept.

Figure 2:
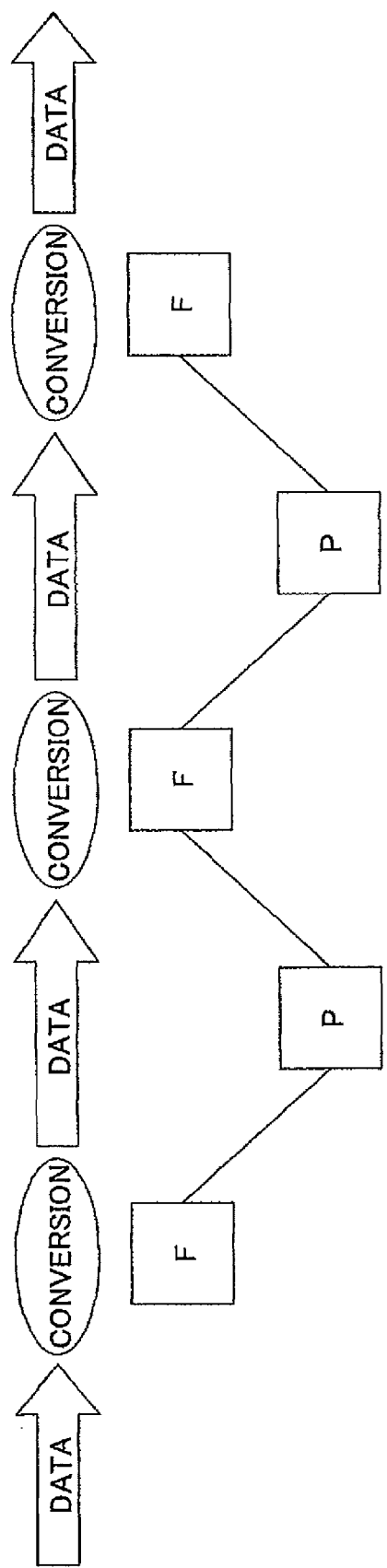
FIG. 2 is a diagram for explaining the pipe and filter concept.

FIG. 2 is a diagram for explaining the pipe and filter concept. In FIG. 2, "F" denotes a filter, and "P" denotes a pipe. As shown in FIG. 2, the filters F are connected by the pipe P. Each filter F carries out a conversion with respect to the input data, and outputs the result of the conversion. Each pipe P transfers the data output from one filter F to another filter F.

In the MFP 1 of this embodiment, each function is treated as a series of "conversions" with respect to the document (data). Each function of the MFP 1 can be generalized in the form of the input, process and output of the document. The "input", "process" and "output" are treated as "conversion", and the software part which performs one "conversion" is formed by the filter F. The filter F which performs the input is referred to as "an input filter". The filter F which performs the process is referred to as "a conversion filter". The filter F which performs the output is referred to as "an output filter". Each of the filters F are independent, and basically, no dependency relationship (call relationship) exists among the filters F. Accordingly, the adding (installing) and deleting (uninstalling) can be performed in units of filters.

Returning now to the description of FIG. 1, the application logic layer 30 includes, as the input filters, a read filter 301, a stored document read filter 302, a mail reception filter 303, a facsimile reception filter 304, a PC document reception filter 305, a report filter 306 and the like.

The read filter 301 controls reading of image data by the scanner, and outputs the read image data. The stored document read filter 302 reads document data (image data) stored in a storage unit of the MFP 1, and outputs the read image data. The mail reception filter 303 receives an electronic mail (hereinafter simply referred to as email), and outputs data included in the received email. The facsimile reception filter 304 controls a facsimile reception, and outputs the received data. The PC document reception filter 305 receives print data from the client PC (not shown), and outputs the received print data. The report filter 306 outputs setting information, log information and the like of the MFP 1 in the form of tabulated data, for example.

The application logic layer 30 includes, as the conversion filters, a document processing filter 311, a document conversion filter 312 and the like. The document processing filter 311 subjects the input data to a predetermined image conversion process (combine, zoom, enlarge, reduce, etc.), and outputs the converted data. The document conversion filter 312 carries out a rendering process. In other words, the document conversion filter 312 converts input PostScript data into bit-map data, and outputs the bit-map data.

The application logic layer 30 includes, as the output filters, a print filter 321, a stored document registration filter 322, a mail transmission filter 323, a facsimile transmission filter 324, a PC document transmission filter 325, a preview filter 326 and the like.

The printer filter 321 makes a plotter output (print) the input data. The stored document registration filter 322 stores the input data into a hard disk within the MFP 1. The mail transmission filter 323 attaches the input data to an email and transmits the email with the attachment. The facsimile transmission filter 324 makes a facsimile transmission of the input data. The PC document transmission filter 325 transmits the input data to the client PC. The preview filter 326 makes a previous display of the input data on the operation panel of the MFP 1.

On the other hand, the application logic layer 30 also includes activities 31 such as a copy activity 31a, a printer activity 31b, and a multi-document activity. The "activity" is a software for performing one "function" (one unit of services of applications provided with respect to the user by the MFP 1).

In other words, by making the user select each of the filters, it is possible to assemble the "function of the MFP 1". However, with respect to a function which is frequently used, such as a copy function, it would be troublesome for the user to instruct execution of the copy function by selecting the filters each time. For this reason, a combination of the filters may be defined in advance as an activity 31, so that the user may select the execution target in units of activities 31. In this case, the selected activity 31 automatically executes each of the filters of the defined combination. As a result, it is possible to eliminate the need for the user to perform a troublesome operation, and it is possible to provide a sense (feeling) of operation similar to that provided to the user by the conventional user interface which selects the execution target in units of applications.

In FIG. 1, the copy activity 31a is an activity 31 which performs the copy function (copy application) by a combination of the read filter 301, the document processing filter 311 and the print filter 321.

The printer activity 31b is an activity 31 which performs a print function (printer application) by a combination of the PC document reception filter 305, the document conversion filter 312 and the print filter 321.

The multi-document activity 31c is an activity 31 which enables a free combination of the input filter, the conversion filter and the output filter.

Each of the activities 31 are independent, and basically no dependency relationship (call relationship) exists among the activities 31. Accordingly, the adding (installing) and deleting (uninstalling) can be performed in units of activities 31. Of course, it is possible to install activities 31 other than the activities 31 (31a, 31b and 31c) shown in FIG. 1, by creating activities by combinations of various filters depending on the needs.

On the other hand, the device service layer 40 is implemented with functions in the lower layer, which are used in common by each of the filters of the application logic layer 30. For example, the device service layer 40 includes an image pipe 41, a data management part 42 and the like. The image pipe 41 performs the function of the pipe P described above. In other words, the image pipe 41 transfers the output data of one filter to another filter. The data management part 42 represents various databases. For example, the various database include a database registered with user information, a database storing documents or image data, and the like.

The device control layer 50 is implemented with a program module group which is called a driver and controls the device (hardware). For example, the device control layer 50 includes a scanner control part 51, a plotter control part 52, a memory control part 53, a telephone line control part 54, a network control part 55 and the like. Each of the control parts 51 through 55 controls the device name appended thereto.

Figure 3:
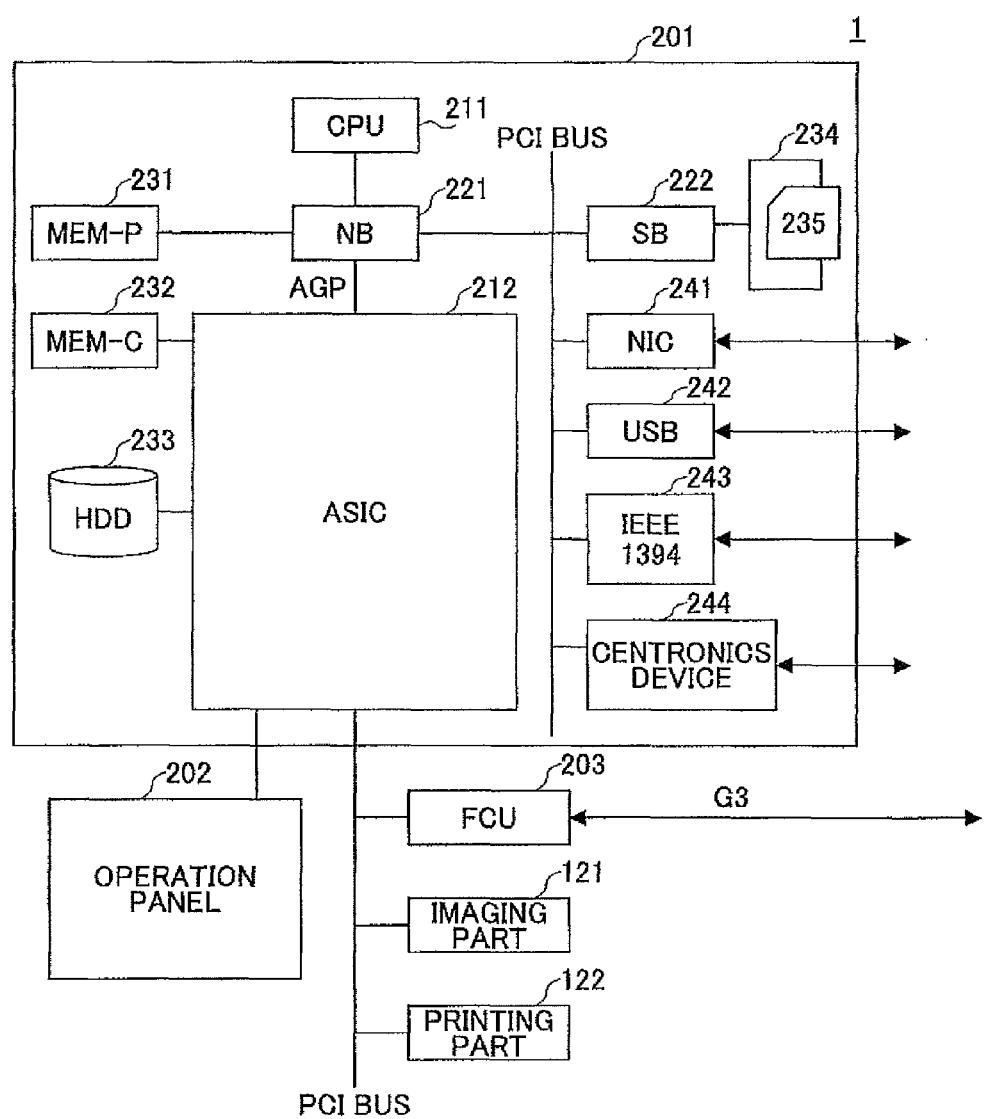
FIG. 3 is a block diagram showing an example of a hardware structure of the MFP.

FIG. 3 is a block diagram showing an example of a hardware structure of the MFP 1. The hardware of the MFP 1 includes a controller 201, an operation panel 202, a Facsimile Control Unit (FCU) 203, an imaging part 121, and a printing part 122.

The controller 201 includes a CPU 211, an ASIC 212, a North Bridge (NB) 221, a South Bridge (SB) 222, a memory (MEM-P) 231, a memory (MEM-C) 232, a Hard Disk Drive (HDD) 233, a memory card slot 234, a Network Interface Controller (NIC) 241, a USB device 242, an IEEE1394 device 243, and a Centronics device 244.

The CPU 211 is an Integrated Circuit (IC) for performing various kinds of information processing. The ASIC 212 is an IC for performing various kinds of image processing. The NB 221 is the north bridge of the controller 201, and the SB 222 is the south bridge of the controller 201. The MEM-P 231 is a system memory of the MFP 1, and the MEM-C 232 is a local memory of the MFP 1. The HDD 233 is a storage unit of the MFP 1. The memory card slot 234 receives a memory card 235 which is set therein. The NIC 241 is a controller for making a network communication using the MAC address. The USB device 242 is a device for providing connection terminals in conformance with the USB specifications. The IEEE 1394 device 243 is a device for providing connection terminals in conformance with the IEEE 1394 specifications. The Centronics device 244 is a device for providing connection terminals in conformance with the Centronics specifications. The operation panel 202 is a hardware (operation part)

for use by the user (operator) when making inputs to the MFP 1, and is also a hardware (display part) for use by the user to obtain outputs of the MFP 1.

For example, the software shown in FIG. 1 is stored in the MEM-C 232, and the CPU 211 processes the software to cause the MFP 1 to execute the functions of the software.

Figure 4:
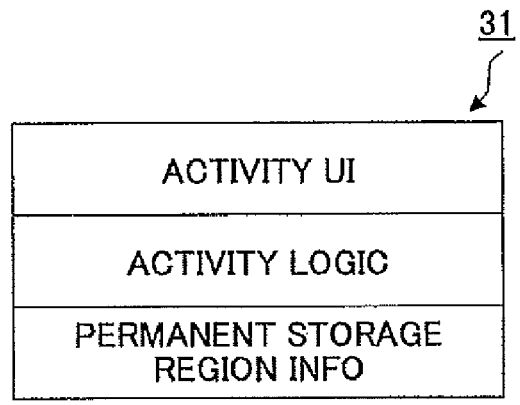
FIG. 4 is a diagram for explaining constituent elements of an activity.

Next, a more detailed description will be given of the activities and the filters. FIG. 4 is a diagram for explaining constituent elements of the activity 31. As shown in FIG. 4, the activity 31 includes an activity UI, an activity logic, a permanent storage region information and the like.

The activity UI is the information or program which displays a screen (for example, a setting screen for setting execution conditions and the like of the activity 31) related to the activity 31 on the operation panel and the like.

The activity logic is the program implemented with the processing contents of the activity 31. Basically, the activity logic is implemented with the logic (for example, an executing sequence of the filters, a setting spanning a plurality of filters, a modification of the filter connection, an error process and the like) related to the combination of the filters.

The permanent storage region information corresponds to schema definition of data which needs to be stored in a nonvolatile memory, such as setting information (for example, default values of execution conditions) with respect to the activity 31. The schema definition is registered in the data management part 42 at the time of installing the activity 31.

Figure 5:
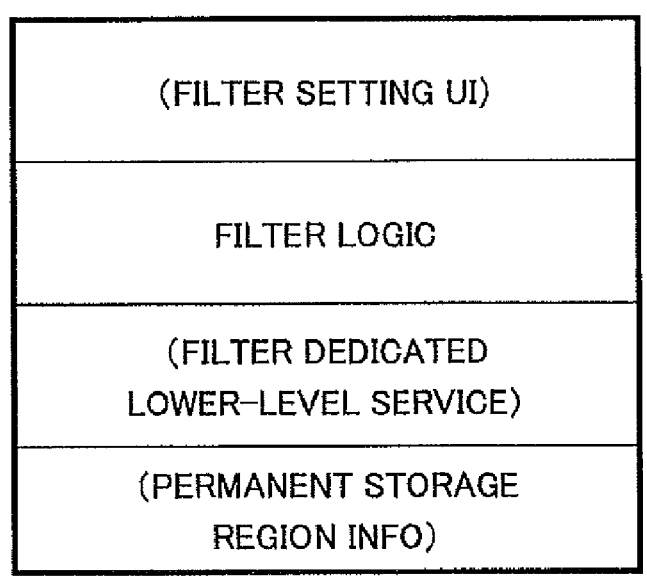
FIG. 5 is a diagram for explaining constituent elements of the filter.

FIG. 5 is a diagram for explaining constituent elements of the filter. As shown in FIG. 5, each filter includes a filter setting UI, a filter logic, a filter dedicated lower-level service, a permanent storage region information and the like. Depending on the filter, the filter setting UI, the filter dedicated lower-level service and the permanent storage region information are not essential constituent elements of the filter, as indicated in parenthesis.

The filter setting UI is a program for causing a screen which is used to set the execution conditions and the like of the filter to be displayed on the operation panel and the like. For example, in the case of the read filter 301, the filter setting UI causes the screen which is used to set the resolution, tone, image type and the like to be displayed on the operation panel. Because the display on the operation panel may be made based on HTML data or script, the filter setting UI may be in ETML data or script.

The filter logic is a program which is implemented with the logic for performing the functions of the filter. In other words, the filter logic performs the functions of the filter depending on the execution conditions set via the filter setting UI, using the filter dedicated lower-level service, the device service layer 40 or the device control layer 50 and the like, as constituent elements of the filter. For example, in the case of the read filter 301 the filter logic is the program implemented with the logic for controlling the reading of the document by the scanner.

The filter dedicated lower-level service is a lower-level function (library), in the lower layer, necessary for performing the filter logic. In other words, the filter dedicated lower-level service corresponds to the function of the device service layer 40 or the device control layer 50, however, a function that is not used by other filters may be implemented as a portion of the filter, and this portion of the filter corresponds to the filter dedicated lower-level service. For example, in the case of the read filter 301, the filter dedicated lower-level service corresponds to the function for controlling the scanner, but in this embodiment, the scanner control part 51 is implemented in the device control layer 50. Hence, it is not essential to implement the filter dedicated lower-level service in the read filter 301.

The permanent storage region information corresponds to the schema definition of the data which needs to be stored in the nonvolatile memory, such as setting information (for example, default values of execution conditions) with respect to the filter. The schema definition is registered in the data management part 42 at the time of installing the filter.

FIG. 6 is a diagram showing an example of a combination of filters for performing the functions of the MFP 1. For example, the copy function is performed by connecting the read filter 301 and the print filter 321. This is because the copy function is performed by printing the image data which is read from the document by the read filter 301 by the print filter 321. When the process such as the combine, zoom, enlarge or reduce is requested, the document process filter 311 which performs this process is interposed between the read filter 301 and the print filter 321, for example.

A printer function (print function from the client PC) is performed by connecting the PC document reception filter 305, the document conversion filter 312 and the print filter 321. A scan-to-email function (function which transfers the scanned image data by email) is performed by connecting the read filter 301 and the mail transmission filter 323. A facsimile transmission function is performed by connecting the read filter 301 and the facsimile transmission filter 324. A facsimile reception function is performed by connecting the facsimile reception filter 304 and the print filter 321. A document box storage function (function which stores the scanned image data within the MFP 1) is performed by connecting the read filter 301 and the stored document registration filter 322. A document box print function (function which prints the document data stored within the MFP 1) is performed by connecting the stored document read filter 302 and the print filter 321.

In FIG. 6, the read filter 301, for example, is used by four functions (copy, scan-to-email, facsimile transmission and document box storage functions). In this manner, each filter can be used by a plurality of functions, to thereby reduce the number of developing processes required to perform each function. For example, the conventional user interfaces for setting the execution conditions were similar for the copy function and the scan function (document box storage function). However, when implementing each function by the application, it was necessary to independently implement the user interface for each application. On the other hand, according to this embodiment, the execution conditions for both the copy function and the scan function can be set by the user interface of the read filter 301, and it is possible to use a common user interface for the setting with respect to a plurality of functions.

Next, a description will be given of a case where a new function is to be performed. First, it is assumed for the sake of convenience that a function #1 which is to be performed prints the print data transmitted from the client PC in the Page Description Language (PDL) which is unsupported by the MFP 1 (hereinafter referred to as "other PDL"). In this case, the printer function shown in FIG. 6 may be used as a template. However, it is a precondition in the printer function that the data output from the PC document reception filter 305 is in the PostScript format. This is because the document conversion filter 312 can only process input data in the PostScript format. In the case of the function #1, however, the data received and output by the PC document reception filter 305 has the other PDL format. For this reason, the document conversion filter 312 cannot execute the process appropriately if the data having the other PDL format is transferred as it is to the document conversion filter 312. Hence, a conversion filter (hereinafter referred to as an "other PDL-PS conversion filter") which executes a data conversion from the other PDL format to the PostScript format is newly implemented and inserted between the PC document reception filter 305 and the document conversion filter 312 in order to perform the function #1. In other words, the function #1 is performed by connecting the PC document reception filter 305, the other PDL-PS conversion filter, the document conversion filter 312 and the print filter 321.

Next, a description will be given of a function #2 which performs the function of collecting information from a Web site and printing the collected information. In this case, however, there is no filter which collects the information from the Web site. Hence, it is necessary to newly implement at least an input filter (hereinafter referred to as a "Web collecting filter") which collects the information from the Web site. In addition, because the function #2 needs to finally execute the printing, it would be appropriate to use the print filter 321 as the output filter. The Web collecting filter and the print filter 321 would need to be connected. However, although the input data of the print filter 321 needs to be bit-map data which has been subjected to the rendering, it would not be appropriate to implement the rendering function within the Web collecting filter because an extremely large number of processes would be required. Hence, it is conceivable to use the document conversion filter 312 which already performs the rendering function. But on the other hand, the input data of the document conversion filter 312 needs to have the PostScript format. Therefore, it will be possible to connect the Web collecting filter and the document conversion filter 312, if the Web collecting filter is implemented to output the collected information in the PostScript format. By implementing the Web collecting filter in this manner, the function #2 is performed by connecting the Web collecting filter and the document conversion filter 312, and connecting the document conversion filter 312 and the print filter 321.

Figure 7:
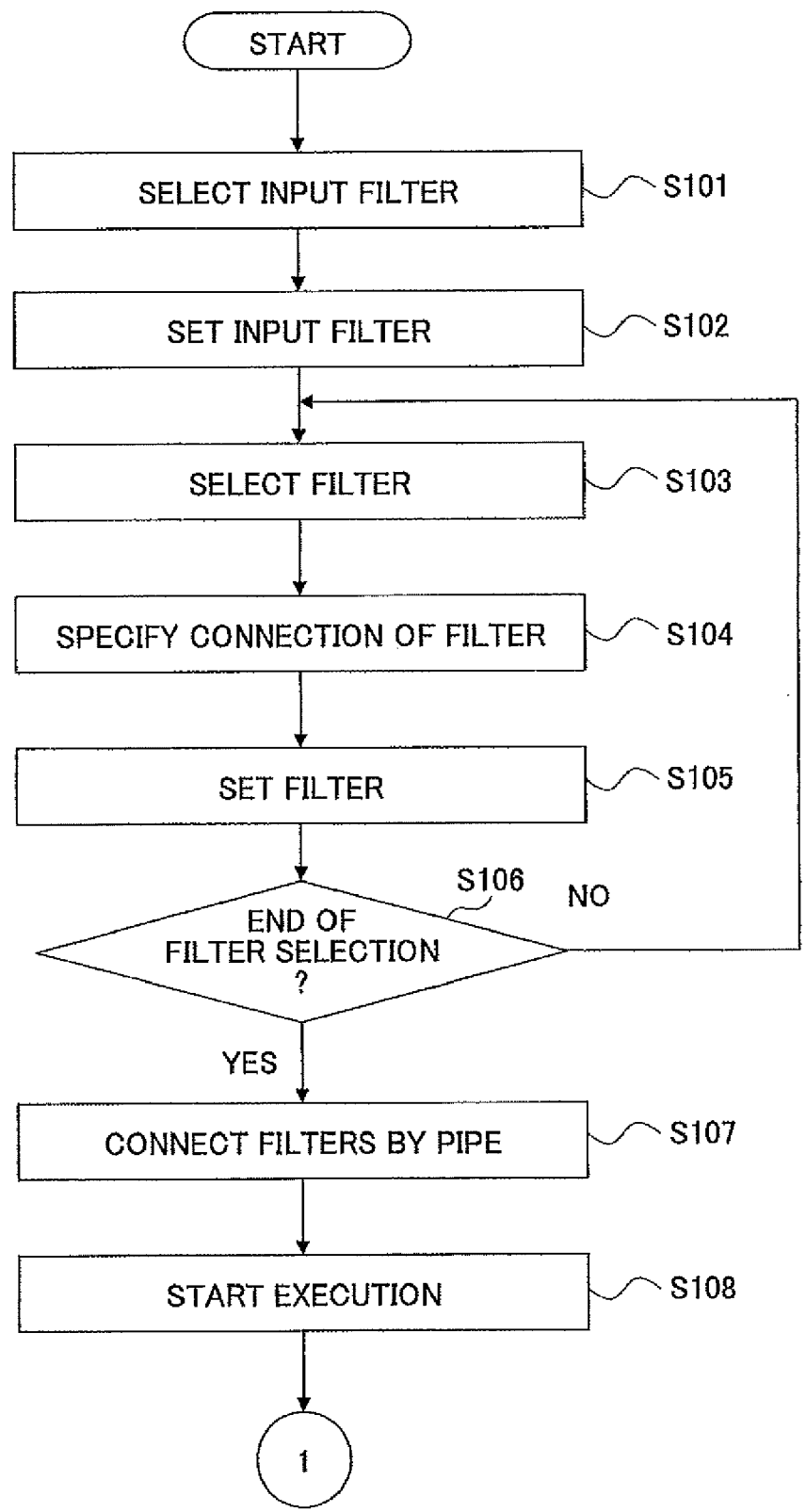
FIG. 7 is a flow chart for explaining a processing sequence when the MFP performs one function.
Figure 8:
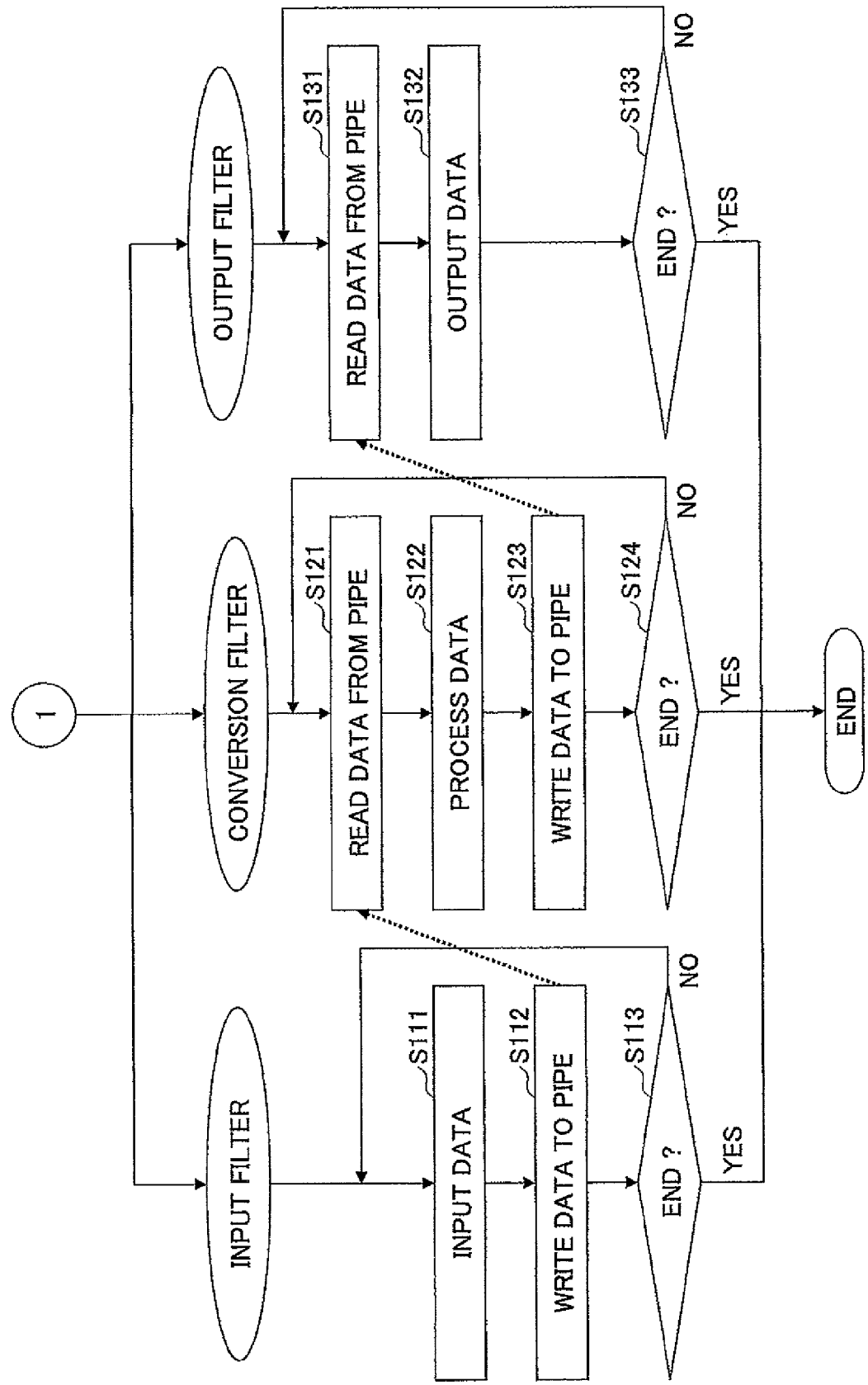
FIG. 8 is a flow chart for explaining the processing sequence when the MFP performs one function.

Next, a description will be given of a processing procedure of the MFP 1 in this embodiment. FIGS. 7 and 8 are flow carts for explaining the processing sequence when the MFP 1 performs one function.

First the user selects an activity and an input filter is specified by the selected activity (step S101), and the execution conditions of the selected input filter are set (step S102). Similarly, a selection is made with respect to the conversion filter or the output filter (step S103), the connection of the filters is specified (step S104), and the execution conditions of the selected conversion or output filter are set (step S105).

Figure 9:
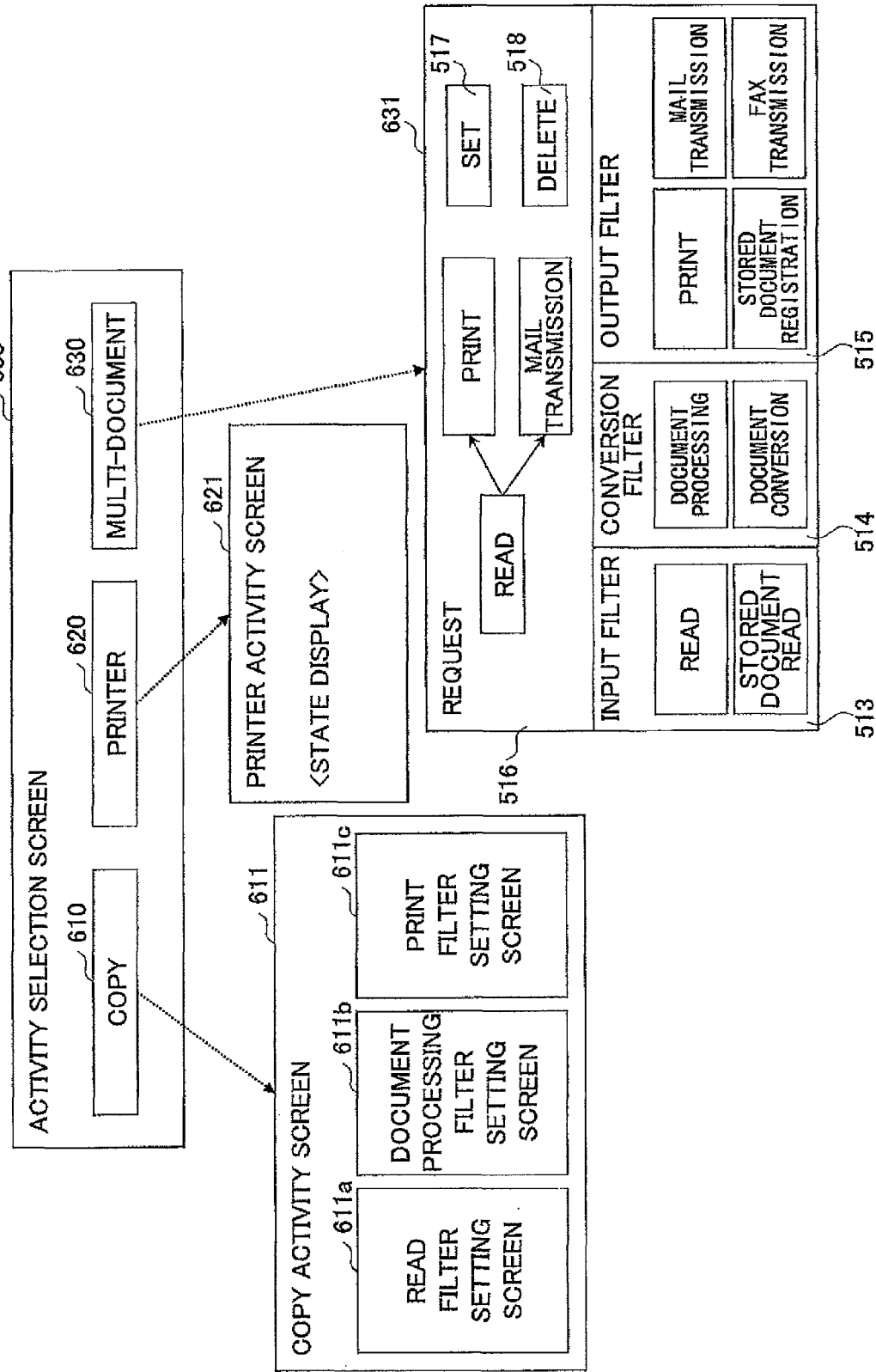
FIG. 9 is a diagram showing an example of an operation screen for causing the use of the activity.

The operation described above is made under the control of the local UI part 12, via the operation panel shown in FIG. 9 (operation panel 202 shown in FIG. 3), for example. The operation panel 202 includes a touch panel and a start button. The touch panel is a hardware (touch operation part) for making an input in response to a touch operation, and a hardware (screen display part) for obtaining the output in the form of the screen display. The start button is a hardware for making an instruction (execution start instruction) to start the execution of the requested function.

FIG. 9 is a diagram showing an example of an operation screen for causing the use of the activity. In FIG. 9, an activity selection screen 600 is the screen that is displayed on the touch panel of the operation panel 202 in order to make the user select the activity which is the execution target. A button is displayed on the activity selection screen 600 for each activity 31 that is installed in the MFP 1. In FIG. 9, a copy button 610 corresponding to the copy activity 31a, a printer button 620 corresponding to the printer activity 31b, and a multi-document button 630 corresponding to the multi-document activity 31c are displayed in the activity selection screen 600.

List information of the activities 31 that are installed is stored in the storage unit, and is managed by the control layer 20, for example. Hence, the local UI part 12 acquires the list information of the activities by making an inquiry to the control layer 20, and displays each button on the activity selection screen 600 based on the list information.

When the user selects (touches) the copy button 610 on the activity selection screen 600, the local UI part 12 calls the activity UI of the copy activity 31a and acquires screen information of the copy activity 31a, and displays a copy activity screen 611 on the touch panel based on the acquired screen information. The copy activity screen 611 is used to set the execution conditions of the copy activity 31a. In the example shown in FIG. 9, setting screens for each of the filters forming the copy activity 31a, namely, a read filter setting screen 611a a document process filter setting screen 611b and a print filter setting screen 611c, are displayed in the copy activity screen 611. This is because the execution conditions of the copy activity 31a are set by setting the execution conditions of each of the filters forming the copy activity 31a. Screen information of the setting screen of each filter forming the copy activity 31a is acquired by calling the filter setting UI of each filter from the activity UI of the copy activity 31a depending on the call from the local UI part 12, and is included (merged) into the screen information of the copy activity 31a. Instead of simply arranging the setting screens of each of the filters, it is possible to display on the copy activity screen 611 a UI for centrally making the settings with respect to each of the filters. For example, the UI in this case may be a two-sided (duplex) to two-sided button, a read setting (two-sided) button, a print setting (two-sided) button and the like.

When the user selects the print button 620, the local UI part 12 calls the activity UI of the printer activity 31b and acquires screen information of the printer activity 31b, and displays a print activity screen 621 on the touch panel based on the acquired screen information. The printer activity screen 621 is used to display a state (for example, printing state or the like) of the printer activity 31b. In other words, the printer activity 31b is started in response to the reception of the print data, and basically does not require a setting screen. The printer activity 31b is not started in response to an operation made from the operation panel 202.

When the user selects the multi-document button 630, the local UI part 12 calls the activity UI of the multi-document activity 31c and acquires screen information of the multi-document activity 31c, and displays a multi-document activity screen 631 on the touch panel based on the acquired screen information.

Arbitrary filters may be combined by an operation made by the user on the multi-document activity screen 631. The multi-document activity screen 633 includes an input filter selection region 513, a conversion filter selection region 514, an output filter selection region 515, a request display region 516 and the like. The input filter selection region 513 is used to select the input filter, and displays a button for each input filter. When one of the buttons in the input filter selection region 513 is selected, a button of the input filter corresponding to the selected button is displayed in the request display region 516. For the sake of convenience, FIG. 9 shows an example where the buttons of the read filter 301 and the stored document read filter 513 are displayed in the input filter selection region 513.

The conversion filter selection region 514 is used to select the conversion filter, and displays a button for each conversion filter. When one of the buttons in the conversion filter selection region 514 is selected, a button of the conversion filter corresponding to the selected button is displayed in the request display region 516.

The output filter selection region 515 is used to select the output filter, and displays a button for each output filter. When one of the buttons in the output filter selection region 515 is selected, a button of the output filter corresponding to the selected button is displayed in the request display region 516. For the sake of convenience, FIG. 9 shows an example where the buttons of the print filter 321, the stored document registration filter 322, the mail transmission filter 323 and the facsimile transmission filter 324 are displayed in the output filter selection region 515.

The list information of the installed filters (input filters, conversion filters and output filters) is stored in the storage unit and is managed by the control layer 20, for example. Accordingly, the local UI part 12 can acquire the list information of the filters by making an inquiry to the control layer 20 in order to display the buttons of the filters in the input filter selection region 513, the conversion filter selection region 514 and the output filter selection region 515.

The buttons of the filters selected in input filter selection region 513, the conversion filter selection region 514 and the output filter selection region 515 are displayed in the request display region 516, and the input filter, the conversion filter and the output filter are connected by arrows indicating the flow of data or the pipe. By manipulating the arrows, it is possible to change the execution sequence of the filters. From the contents displayed in the request display region 516, the user can recognize the filters that are used and the flow of data. The request display region 516 further includes a set button 517 and a delete button 518. In a state where the button of the filter is selected in the request display region 516, the set button 517 is used to display the setting screen of the selected filter. In other words, when the set button 517 is pushed (touched), the setting screen of the selected filter is displayed on the touch panel based on the filter setting UI of the selected filter. In a state where the button of the filter is selected in the request display region 516, the delete button 518 is used to cancel the use of the selected filter.

One or a plurality of input filters, one or a plurality of conversion filters, and one or a plurality of output filters may respectively be used with respect to one function. For example, in a case where a scanned image and an image stored within the MFP 1 are synthesized and printed, and also sent by facsimile transmission, at least two input filters (read filter 301 and stored document read filter 302) and two output filters (print filter 321 and facsimile transmission filter 324) are selected.

Returning now to the description of FIG. 7, when the filter selection is completed (YES in step S106), the requested contents are notified from the user interface layer 10 with respect to the control layer 20 when the start button is pushed.

Figure 10:
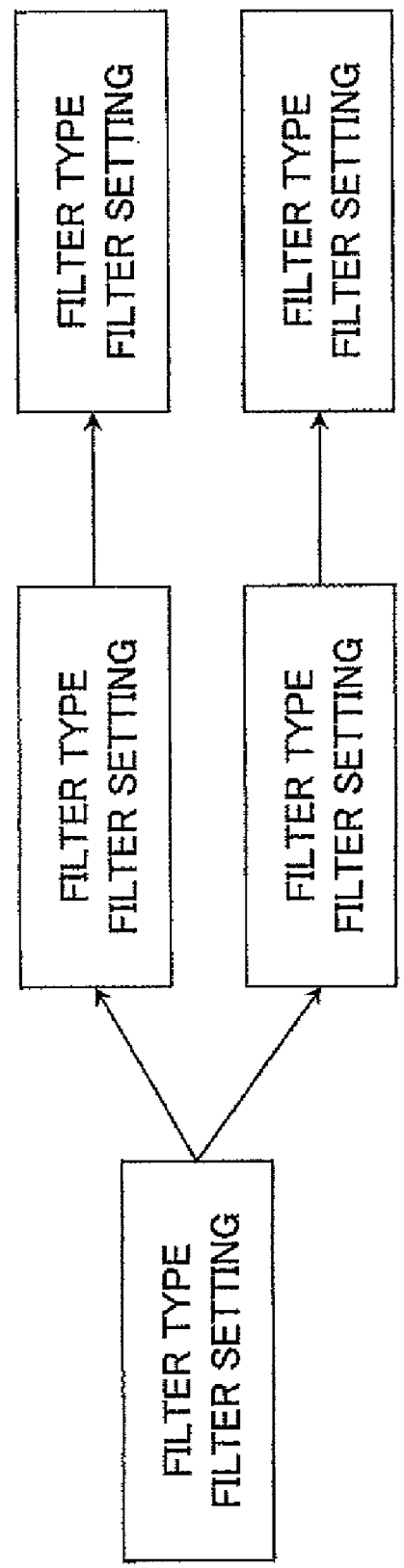
FIG. 10 is a diagram generally showing requested contents notified from a user interface layer to a control layer.

FIG. 10 is a diagram generally showing the requested contents notified from the user interface layer 10 to the control layer 20. As shown in FIG. 10, the request from the user interface layer 10 includes the filter type and the setting information with respect to the filter, for each filter that is selected in the user interface layer 10. The request from the user interface layer 10 further includes the execution sequence of the filters. In FIG. 10, the arrows connecting the blocks indicate the execution sequence of the filters.

Returning now to the description of FIG. 7, the control layer 20 connects the selected filters by the pipes in response to the requested contents described above (step S107). The pipe is actually a memory (including HDD), but the type of memory used depends on the filters located on both ends of the pipe, and for example, the corresponding relationship of the pipes and the filters is defined in advance within the HDD of the MFP 1.

FIG. 11 is a diagram showing an example of a correspondence table of the filters and pipes. According to a correspondence table 60 shown in FIG. 11, the read filter 301 and the print filter 321 are connected by a Direct Memory Access (DMA) pipe, and the document conversion filter 312 and the print filter 321 are connected by a DMA pipe, and a high-speed data transfer is made between the filters via the DMA pipe. In addition, the PC document reception filter 305 and the document conversion filter 312 are connected by a spool pipe. The spool pipe uses the HDD, and the data output from the left filter is spooled (stored) in the HDD until the data is read by the right filter. Other filters are connected by a general-purpose memory pipe. The general-purpose memory pipe makes a data transfer using a RAM buffer having a finite size. The correspondence table 60 shown in FIG. 11 may be edited depending on expansion (addition), deletion and the like of the filters and pipes. The image pipe 41 shown in FIG. 1 represents, in abstract form, the module which provides an interface to each of the various types of pipes described above.

Figure 12:
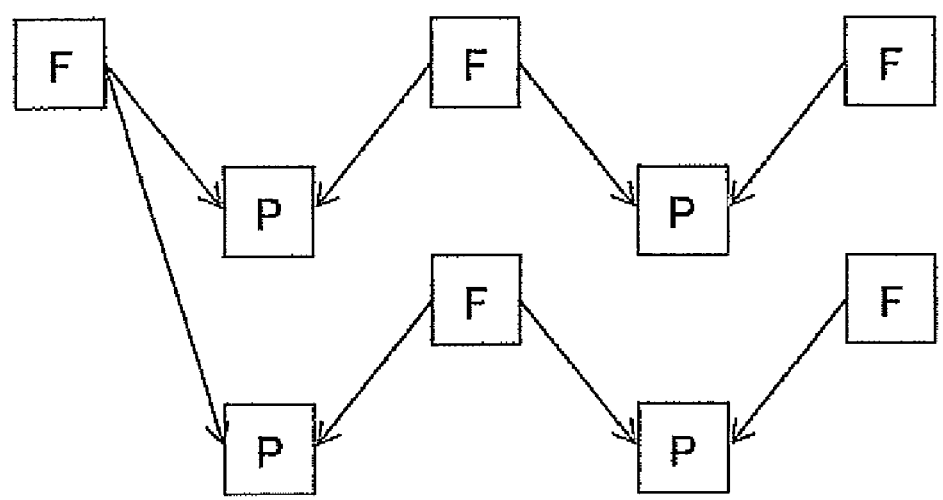
FIG. 12 is a diagram conceptually showing information that is generated by the control layer.

Therefore, the control layer 20 connects the filters by the specific pipes based on the correspondence table 60 shown in FIG. 11. FIG. 12 is a diagram conceptually showing information that is generated by the control layer 20. FIG. 12 shows the filters F connected by the pipes P.

Returning now to the description of FIG. 7, the control layer 20 outputs an execution request in parallel with respect to each of the filters (step S108). In other words, the filters are not called in the sequence in which the filters are connected, and all of the filters are called approximately at the same time. The synchronization among the filters is made by the pipes. Hence, when the execution request from the control layer 20 is received, each filter waits until the data is input to the pipe which is connected to the input end thereof. However, the input filter has no pipe connected to the input end thereof. Thus, the input filter starts a process in response to the execution request.

Next, in FIG. 8, the input filter inputs the data from the input device (step S111), and outputs the data to the pipe which is connected to an output end thereof (step S112). In a case where the data is input a plurality of times in segments (for example, when a plurality of pages of the document are scanned), the data input and the data output to the pipe are repeated. When the process with respect to all input data ends (YES in step S113), the process of the input filter ends.

The conversion filter starts a process when the data input with respect to the pipe which is connected to the input end thereof is detected. First, the conversion filter reads the data from the pipe (step S121), and subjects the data to an image processing (step S122). Then, the conversion filter outputs the data obtained as a result of the image processing to the pipe which is connected to the output end thereof (step S123). When the process ends with respect to all data input to the pipe, which is connected to the input end of the conversion filter (YES in step 3124), the process of the conversion filter ends.

The output filter starts a process when the data input with respect to the pipe which is connected to the input end thereof is detected. First, the output filter reads the data from the pipe (step S131), and outputs the data using the output device (step S132). When the process with respect to all data input to the pipe which is connected to the input end of the output filter ends (YES in step S133), the process of the output filter ends.

Figure 13:
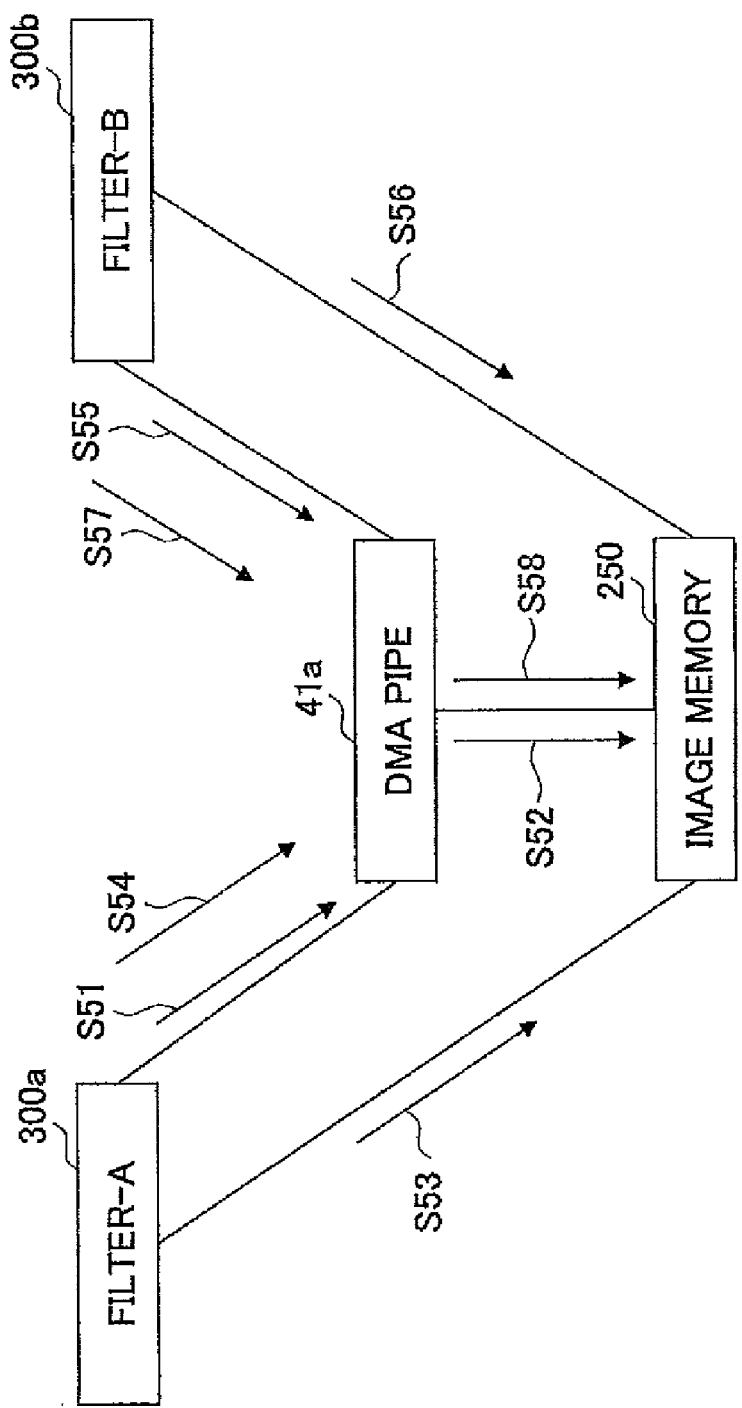
FIG. 13 is a diagram for explaining a data transfer procedure between the filters via the pipe.

Next, a more detailed description will be given of the pipe. FIG. 13 is a diagram for explaining a data transfer procedure between the filters via the pipe. In FIG. 13, a filter-A 300*a* and a filter-B 300*b* are connected via a DMA pipe 41*a* which is an example of the image pipe 41 described above in conjunction with FIG. 11. An image memory 250 is a physical (hardware) image memory that is provided in the MFP 1.

When the data (image data) is transferred from the filter-A 300*a* to the filter-B 300*b*, the filter-A 300*a* requests securing a memory region for storing the image data with respect to the DMA pipe 41*a* (step S51). The DMA pipe 41*a* secures the memory region, and returns an address of the secured memory region to the filter-A 300*a* (step S52). The filter-A 300*a* writes the image data to the returned address of the image memory 250 (step S53), and notifies the address where the image data is written to the DMA pipe 41*a* (step S54).

The filter-B 300*b* repeats inquiring (periodically) the address where the image data is written, with respect to the DMA pipe 41*a* (step S55). However, the filter-B 300*b* may wait until the address is notified to the DMA pipe 41*a*. When the address is notified to the DMA pipe 41*a*, the filter-B 300*b* acquires the address, and detects writing of the image data with respect to the image memory 250. Hence, the filter-B 300*b* reads the image data from the acquired address of the image memory 250 (step S56), and executes a process of the filter-B 300*b* with respect to the read image data. When the process with respect to the read image data is completed, the filter-B 300*b* requests the DMA pipe 41a to release the memory region at the address (step S57), and the DMA pipe 41*a* releases the memory region (step S58).

Accordingly, by transferring the data among the filters via the image memory (shared memory), it becomes unnecessary to secure a memory region for storing the image data for each filter. As a result, the memory utilization efficiency and the processing performance are improved. In addition, it is possible to maintain the independence of the filters because no call relationship exists among the filters.

Second Embodiment

When new marking information is to be synthesized when making various markings at the time of outputting images on paper, a second embodiment of the present invention enables the new marking information to be added without making considerable modifications to the existing output component (output filter). It is a precondition in this second embodiment that the pipe and filter mechanism is used. A description of the basic structure and operation of the pipe and filter mechanism will be omitted, because the pipe and filter mechanism was described above with respect to the first embodiment.

Figure 14:
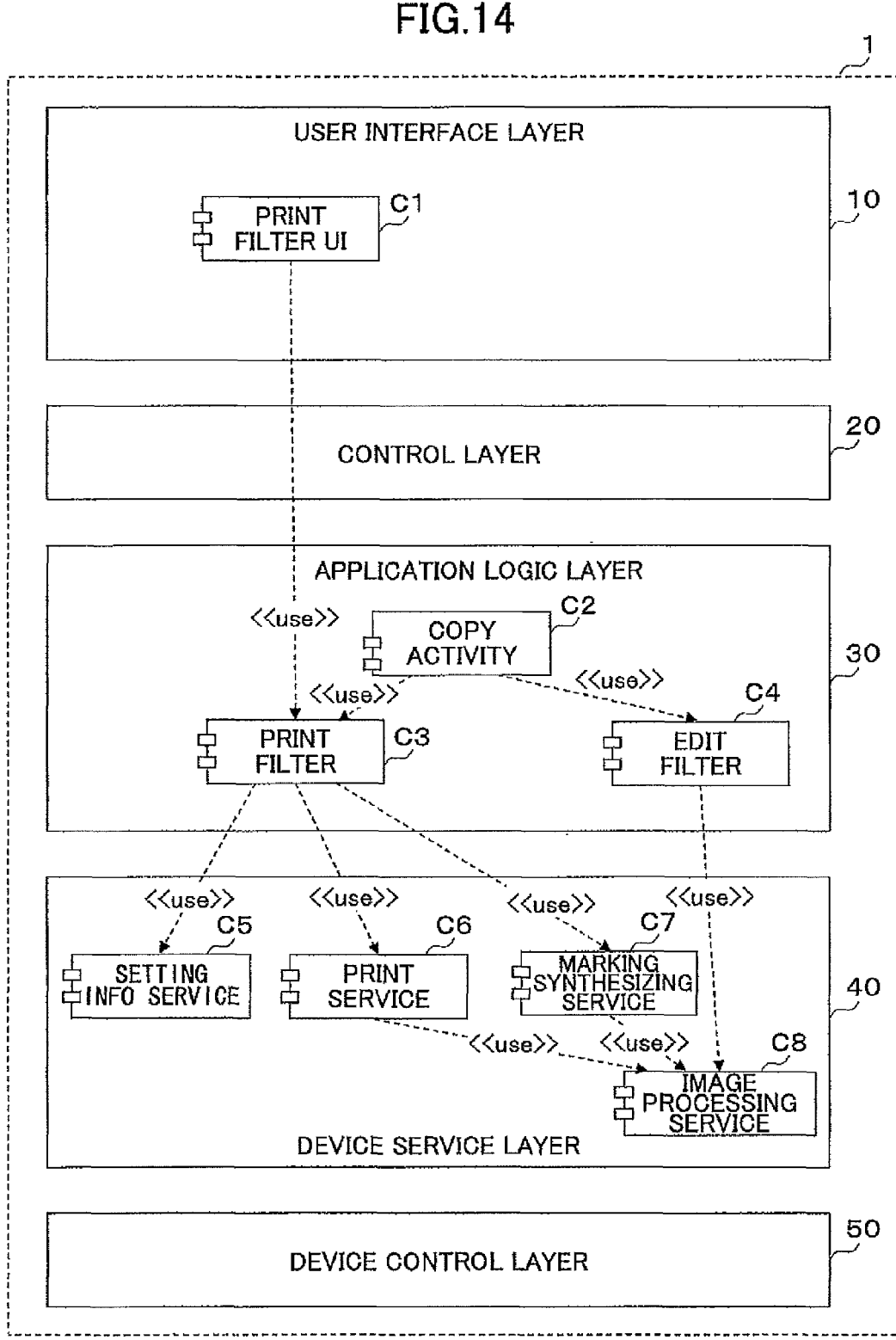
FIG. 14 is a diagram showing an example of a software structure of the MFP in a second embodiment of the present invention.

FIG. 14 is a diagram showing an example of a software structure of the MFP 1 in this second embodiment of the present invention.

In FIG. 14, a component of a print filter UI C1 is provided in the user interface layer 10. Components of a copy activity C2, a print filter C3 and an edit filter C4 are provided in the application logic layer 30. Components of a setting information service C5, a print service C6, a marking synthesizing service C7 and an image processing service C8 are provided in the device service layer 40.

Each of the components have the following responsibilities.

Print Filter UI C1: To provide a user interface related to the print function.

Copy Activity C2: To provide a copy function to the user by combining a plurality of filters.

Print Filter C3: To provide print functions such as two-sided (duplex) printing and sorting, by controlling the print service C6.

Edit Filter C4: To provide image edit functions such as combine and print, by controlling the image processing service C8.

Setting Information Service C5: To manage references and changes (modifications) to the data related to the initial setting of the MFP 1.

Print Service C6: To perform the print function by controlling a plotter engine (corresponding to the printing part 122 shown in FIG. 3) within the MFP 1.

Marking Synthesizing Service C7: To create a synthesizing image necessary for the marking synthesis.

Image Processing Service C8: To perform an image processing by controlling an image processing unit (corresponding to the ASIC 212 shown in FIG. 3) within the MFP 1, and to manage the memory in conjunction with the image processing.

Figure 15A:
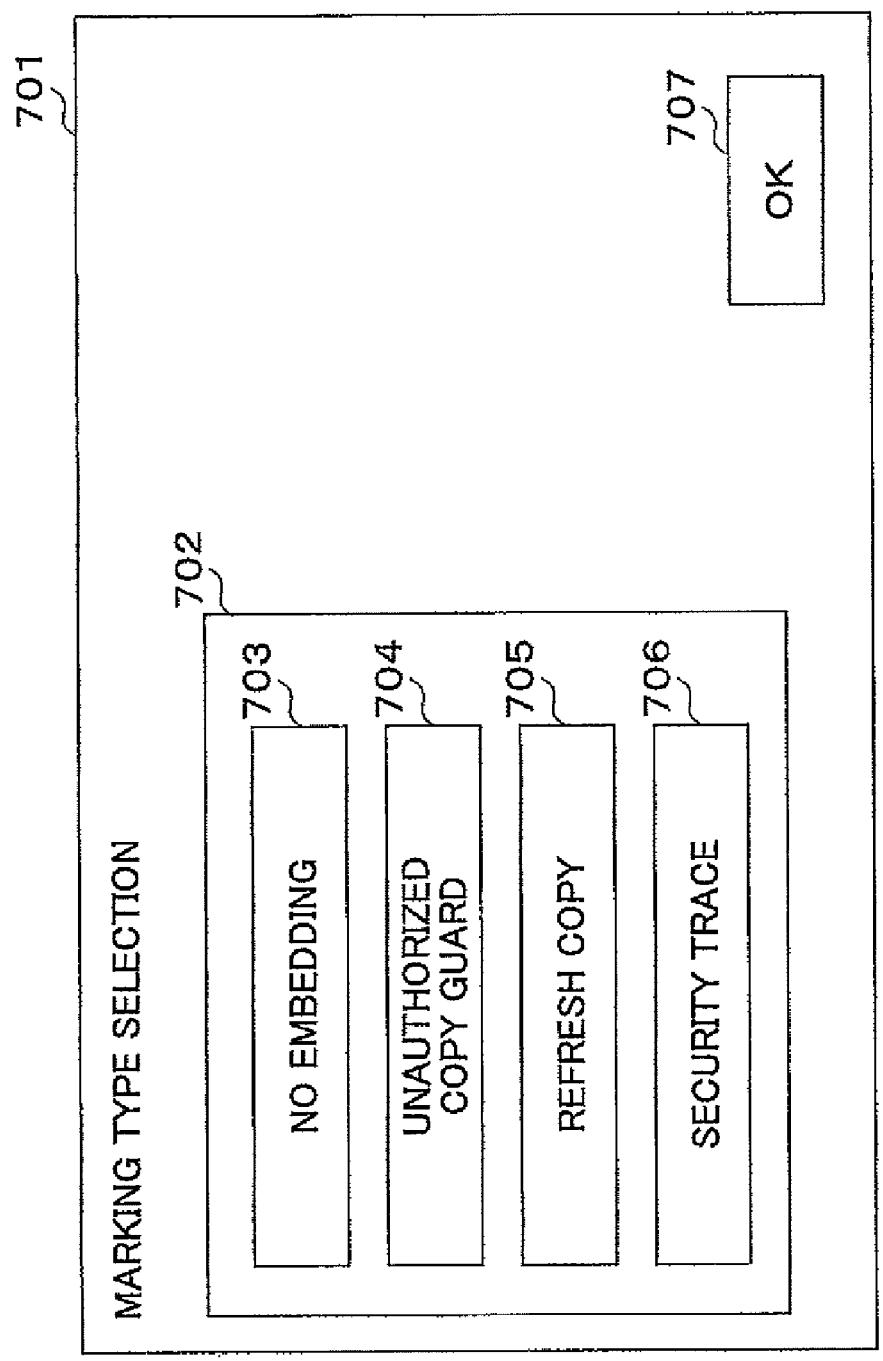

FIGS. 15A and 15B are diagrams showing examples of a marking condition setting screen. FIG. 15A shows an example of a marking type selection screen 701. The marking type is selected by pushing one of a "no embedding" selection button 703, an "unauthorized copy guard" selection button 704, a "refresh copy" selection button 705, and a "security trace" selection button 706 in a marking type selection column 702. With the exception of the "no embedding" selection button 704, the screen makes a transition to the detailed setting screen if one of the "unauthorized copy guard" selection button 704, the "refresh copy" selection button 705 and the "security trace" selection button 706. The setting is completed by pushing an "OK" button 707.

The "unauthorized copy guard" is a function of embedding, in a document, marking information for suppressing the function such as copy and transmission which would distribute the document to a large number of unspecified people when a leak of the document is to be prevented. The "refresh copy" is a function of embedding, in the document, marking information for indicating a stored document which is the original document when printing the document on paper, in order to obtain the original document in which handwritten information is removed from the paper document. The "security trace" is a function of embedding, in the document, marking information for indicating trace information. This trace information indicates who has used the document and how the document was used. The "no embedding" indicates that the above marking information is not embedded in the document.

FIG. 15B shows an example of a refresh copy setting screen 708 which is displayed when the "refresh copy" selection button 705 is pushed on the marking type selection screen 701 shown in FIG. 15A. Similar setting screens are displaced when the "unauthorized copy guard" selection button 704, the "refresh copy" selection button 705 and the "security trace" selection button 706 are pushed on the marking type selection screen 701 shown in FIG. 15A. The setting screens have similar setting items, and at least includes an embedding position and an embedding format.

In FIG. 15B, the embedding position of the marking information is elected by pushing one of a "top right" selection button 710, a "top left" selection button 711, a "bottom right"

selection button 712, and a "bottom left" selection button 713 in an embedding position setting column 709. In addition, an offset from a standard (reference position) is set by inputting a numerical value in an x-direction adjusting amount input column 714 and a y-direction adjusting amount input column 715.

The embedding type (bar code type) is selected by pushing one of a "QR" selection button 717, a "PDF417" selection button 718, and a "DataMatrix" selection button 719 in an embedding type selection column 716. The setting is completed by pushing an "OK" button 720.

Figure 16:
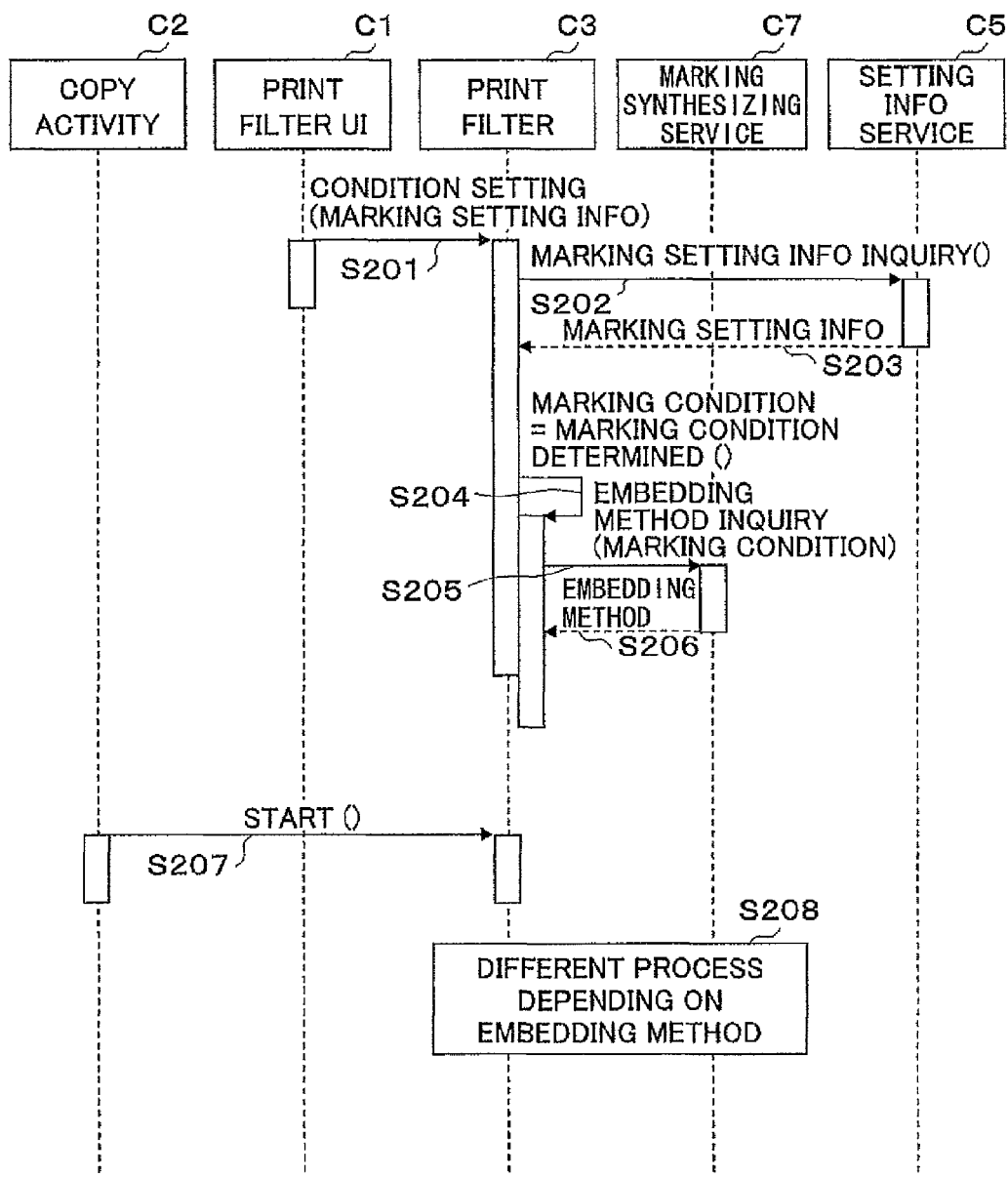
FIG. 16 is a sequence diagram showing an example of the process of the second embodiment.

FIG. 16 is a sequence diagram showing an example of the process of this second embodiment. Although the copy activity C2 is shown in FIG. 16, the activity may of course be a print activity.

In FIG. 16, when the setting of the marking condition by the user is completed (the "OK" buttons 707 and 720 shown in FIGS. 15A and 15B are pushed), the print filter UI C1 makes a condition setting request to the print filter C3 in conjunction with the marking setting information (user setting) (step S201).

The print filter C3 inquires the marking setting information (initial setting) within the MFP 1 to the setting information service C5 (step S202), and acquires the marking setting information (initial setting) (step S203). FIG. 17 is a diagram showing an example of the marking setting information stored in the setting information service C5 as the initial setting. One of "no embedding", unauthorized copy guard" and "refresh copy" is set as an attribute "marking type", and one of "top right", "top left", "bottom right" and "bottom left" and values of the x-direction adjusting amount and the y-direction adjusting amount are set as an attribute "embedding position". In addition, one of "QR", "PDF417" and "DataMatrix" is set as an attribute "embedded type (bar code type)".

Returning now to the description of FIG. 16, the print filter C3 sets the marking condition by carrying out a marking condition determination process (step S204). In this state, unless the initial setting is the "no embedding", the initial setting is set as the marking condition with priority. If the initial setting is the "no embedding", the user setting is set as the marking condition. This is because there is a strong management demand with respect to the marking, and if a predetermined marking condition is specified as the initial setting, this predetermined marking condition should be used with priority. FIG. 18 is a diagram showing an example of a marking condition determination rule. If the initial setting is the "refresh copy", the "refresh copy" is set as the marking condition regardless of the user setting. If the initial setting is the "unauthorized copy guard", the "unauthorized copy guard" is set as the marking condition regardless of the user setting. If the initial setting is the "security trace", the "security trace" is set as the marking condition regardless of the user setting. But if the initial setting is the "no embedding", the user setting is set as the marking condition.

Returning now again to the description of FIG. 16, the print filter C3 inquires the embedding method to the marking synthesizing service C7 in conjunction with the determined marking condition (step S205), and acquires the embedding method (step S206). FIG. 19 is a diagram showing an example of the embedding method which is returned from the marking synthesizing service C7. FIG. 19 indicates that "(embedding to) only first page" is returned with respect to the marking type "refresh copy", "(embedding to) all pages" is returned with respect to the marking type "unauthorized copy guard", and "all pages" is returned with respect to the marking type "security trace". There is no embedding method with respect to the marking type "no embedding". The differences in the embedding methods are based on the characteristics of the respective marking types. Hence, the embedding method is "only first page" for the marking type "refresh copy" because the "refresh copy" only needs to specify the original document. The embedding method is "all pages" for the marking types "unauthorized copy" and "security trace" because the "unauthorized copy" and "security trace" requires consideration for each page.

Returning to the description of FIG. 16, when the execution of the copy activity C2 is started in response to the pushing of the start button by the user, the copy activity C2 requests execution start (start) to the print filter C3 (step S207). In response to this execution start request, the print filter C3 carries out a different process depending on the marking condition which is determined and the embedding method at the present point in time (step S208).

Figure 20:
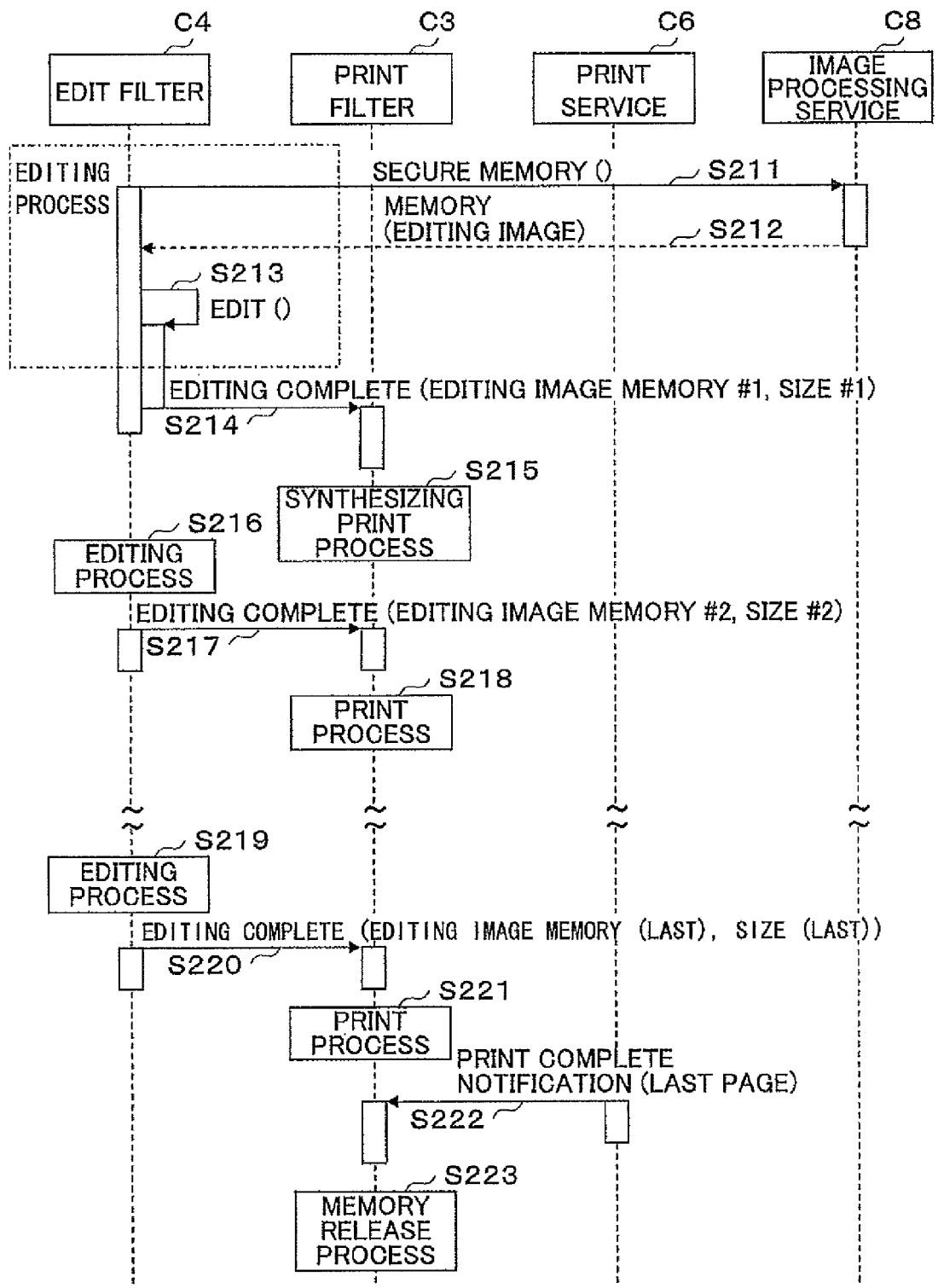
FIG. 20 is a sequence diagram showing an example of a process (embedding to only the first page) which differs depending on the embedding method.

FIG. 20 is a sequence diagram showing an example of a process (embedding to only first page) which differs depending on the embedding method. In other words, FIG. 20 shows the process for a case where the embedding method "only first page", corresponding to the marking type "refresh copy", is determined (or committed).

In FIG. 20, the edit filter C4 requests the image processing service C6 to secure a memory, as the process of the first page (step S211), and acquires an editing image memory (step S212). Then, the edit filter C4 carries out an image editing process (step S213), and notifies completion of the editing to the print filter C3 in conjunction with the editing image memory and the size thereof (step S214). Thereafter, the print filter C3 carries out a synthesizing print process which synthesizes the document image and the marking image and prints the synthesized image (step S215). Details of the synthesizing print process will be described later.

Next, the edit filter C4 carries out an image editing process (similar to steps S211 through S213) with respect to the second page (step S216), and notifies completion of the editing to the print filter C3 in conjunction with the editing image memory and the size thereof (step S217). Then, the print filter C3 carries out a print process to print only the document image (step S218). The details of the print process will be described later.

The third and subsequent pages are processed in a manner similar to the above.

Next, the edit filter C4 carries out an image editing process (similar to steps S211 through S213) with respect to the last page (step S219), and notifies completion of the editing to the print filter C3 in conjunction with the editing image memory and the size thereof (step S220). Then, the print filter C3 carries out a print process to print only the document image (step S221). The details of the print process will be described later.

When the print filter C3 receives a notification from the print service C6 indicating the completion of the printing of the last page (step S222), the print filter C3 carries out a memory release process to release the process used for the process described above (step S223). Details of the memory release process will be described later.

Figure 21:
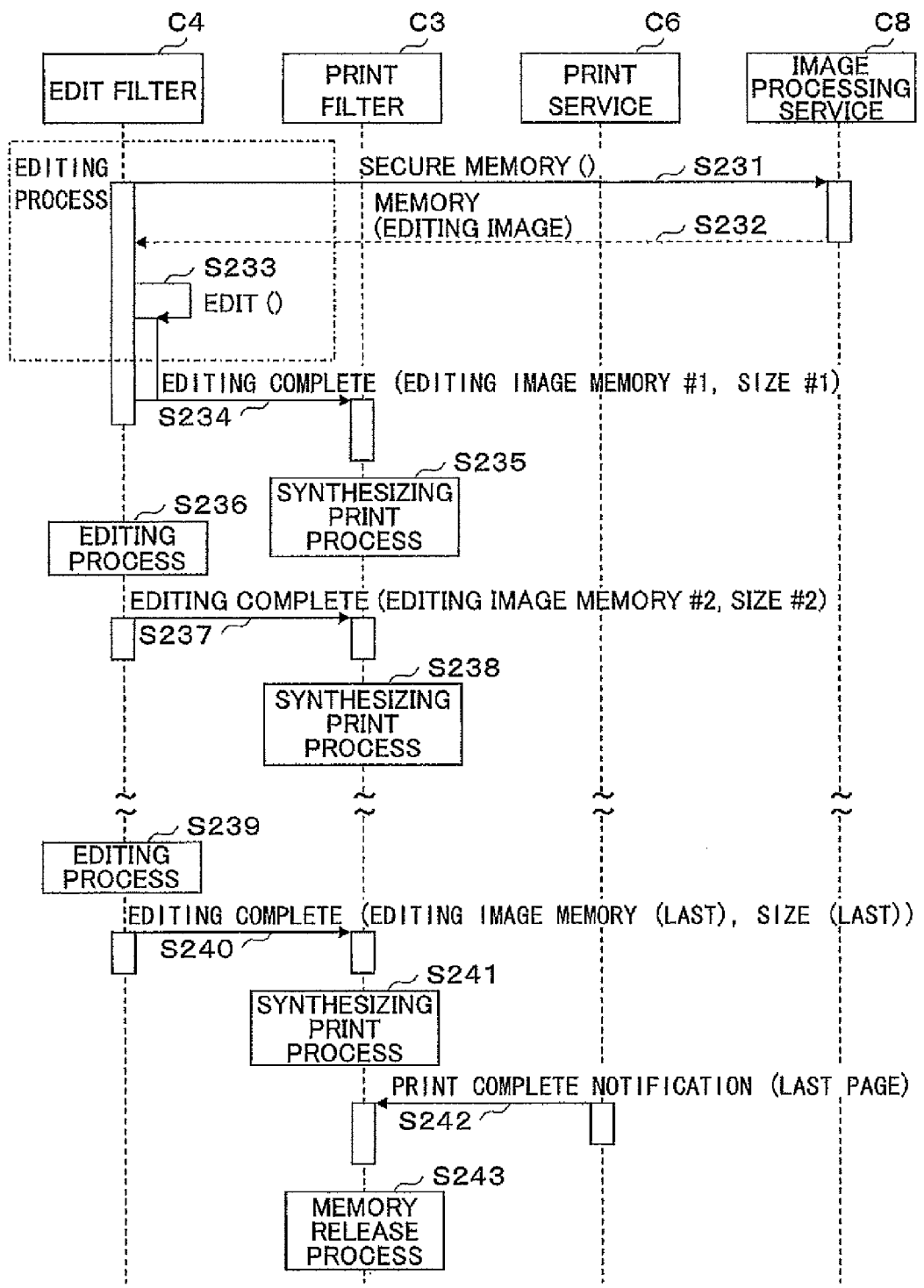
FIG. 21 is a sequence diagram showing an example of a process (embedding to all pages) which differs depending on the embedding method.

FIG. 21 is a sequence diagram showing an example of a process (embedding to all pages) which differs depending on the embedding method. In other words, FIG. 21 shows the process for a case where the embedding method "all pages", corresponding to the marking type "unauthorized copy guard" or "security trace", is determined.

In FIG. 21, the edit filter C4 requests the image processing service C8 to secure a memory, as the process of the first page (step S231), and acquires an editing image memory (step S232). Then, the edit filter C4 carries out an image editing process (step S233), and notifies completion of the editing to the print filter C3 in conjunction with the editing image memory and the size thereof (step S234). Thereafter, the print filter C3 carries out a synthesizing print process which synthesizes the document image and the marking image and prints the synthesized image (step S235). Details of the synthesizing print process will be described later.

Next, the edit filter C4 carries out an image editing process (similar to steps S231 through S233) with respect to the second page (step S236), and notifies completion of the editing to the print filter C3 in conjunction with the editing image memory and the size thereof (step S237). Then, the print filter C3 carries out a synthesizing print process which synthesizes the document image and the making image, also for the second page, and prints the synthesized image (step S238). The details of the print process will be described later.

The third and subsequent pages are processed in a manner similar to the above.

Next, the edit filter C4 carries out an image editing process (similar to steps S231 through S233) with respect to the last page (step S239), and notifies completion of the editing to the print filter C3 in conjunction with the editing image memory and the size thereof (step S240). Then, the print filter C3 carries out a synthesizing print process which synthesizes the document image and the marking image, also for the last page, and prints the synthesized image (step S241). The details of the print process will be described later.

When the print filter C3 receives a notification from the print service C6 indicating the completion of the printing of the last page (step S242), the print filter C3 carries out a memory release process to release the process used for the process described above (step S243). Details of the memory release process will be described later.

Figure 22:
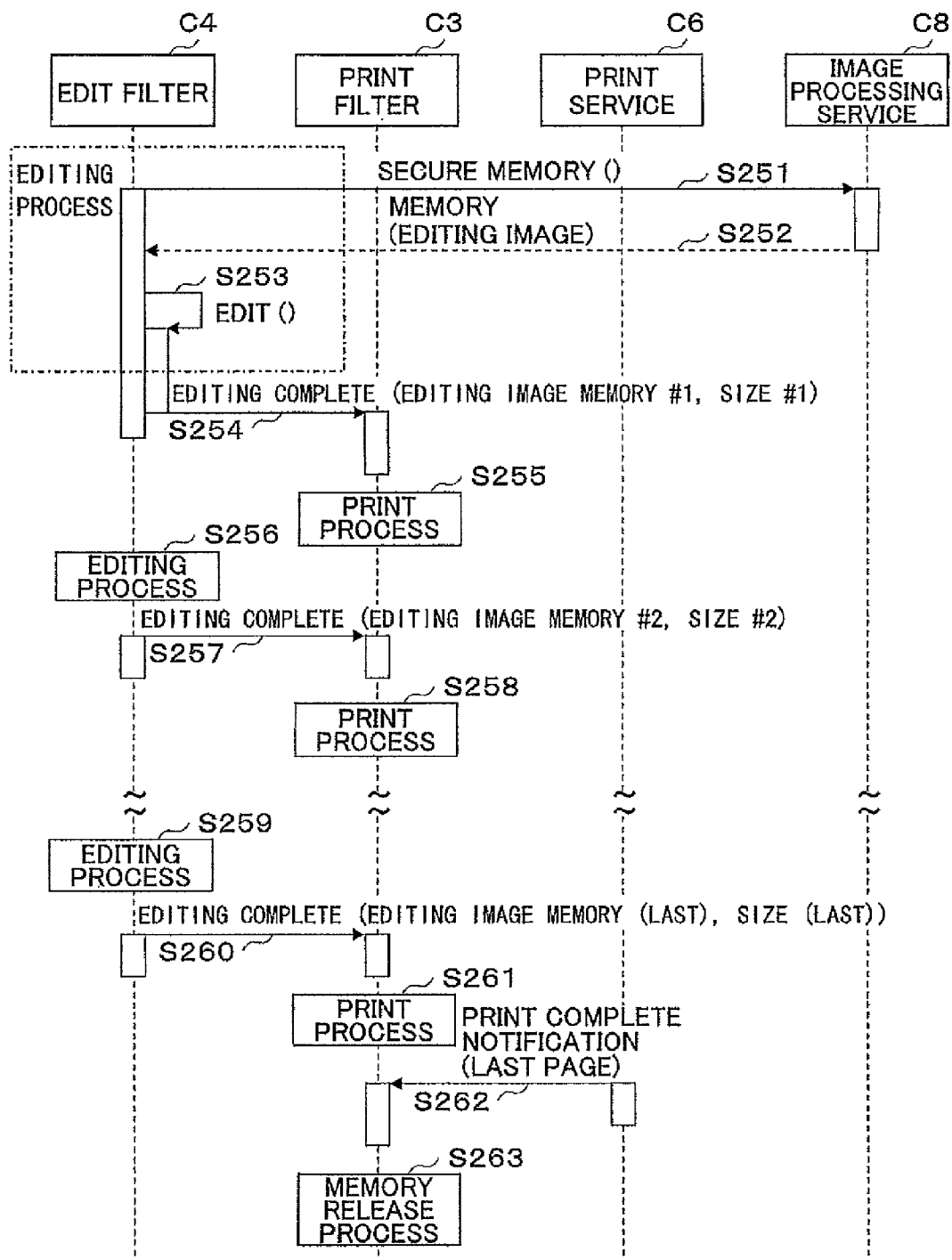
FIG. 22 is a sequence diagram showing an example of a process (no embedding) which differs depending on the embedding method.

FIG. 22 is a sequence diagram showing an example of a process (no embedding) which differs depending on the embedding method.

In FIG. 22, the edit filter C4 requests the image processing service C8 to secure a memory, as the process of the first page (step S251), and acquires an editing image memory (step S252). Then, the edit filter C4 carries out an image editing process (step S253), and notifies completion of the editing to the print filter C3 in conjunction with the editing image memory and the size thereof (step S254). Thereafter, the print filter C3 carries out a print process to print only the document image (step S255). Details of the print process will be described later.

Next, the edit filter C4 carries out an image editing process (similar to steps S251 through S253) with respect to the second page (step S256), and notifies completion of the editing to the print filter C3 in conjunction with the editing image memory and the size thereof (step S257). Then, the print filter C3 carries out a print process to print only the document image, also for the second page (step S258). The details of the print process will be described later.

The third and subsequent pages are processed in a manner similar to the above.

Next, the edit filter C4 carries out an image editing process (similar to steps S251 through S253) with respect to the last page (step S259), and notifies completion of the editing to the print filter C3 in conjunction with the editing image memory and the size thereof (step S260). Then, the print filter C3 carries out a print process to print only the document image, also for the last page (step S261). The details of the print process will be described later.

When the print filter C3 receives a notification from the print service C6 indicating the completion of the printing of the last page (step S262), the print filter C3 carries out a memory release process to release the process used for the process described above (step S263). Details of the memory release process will be described later.

Figure 23:
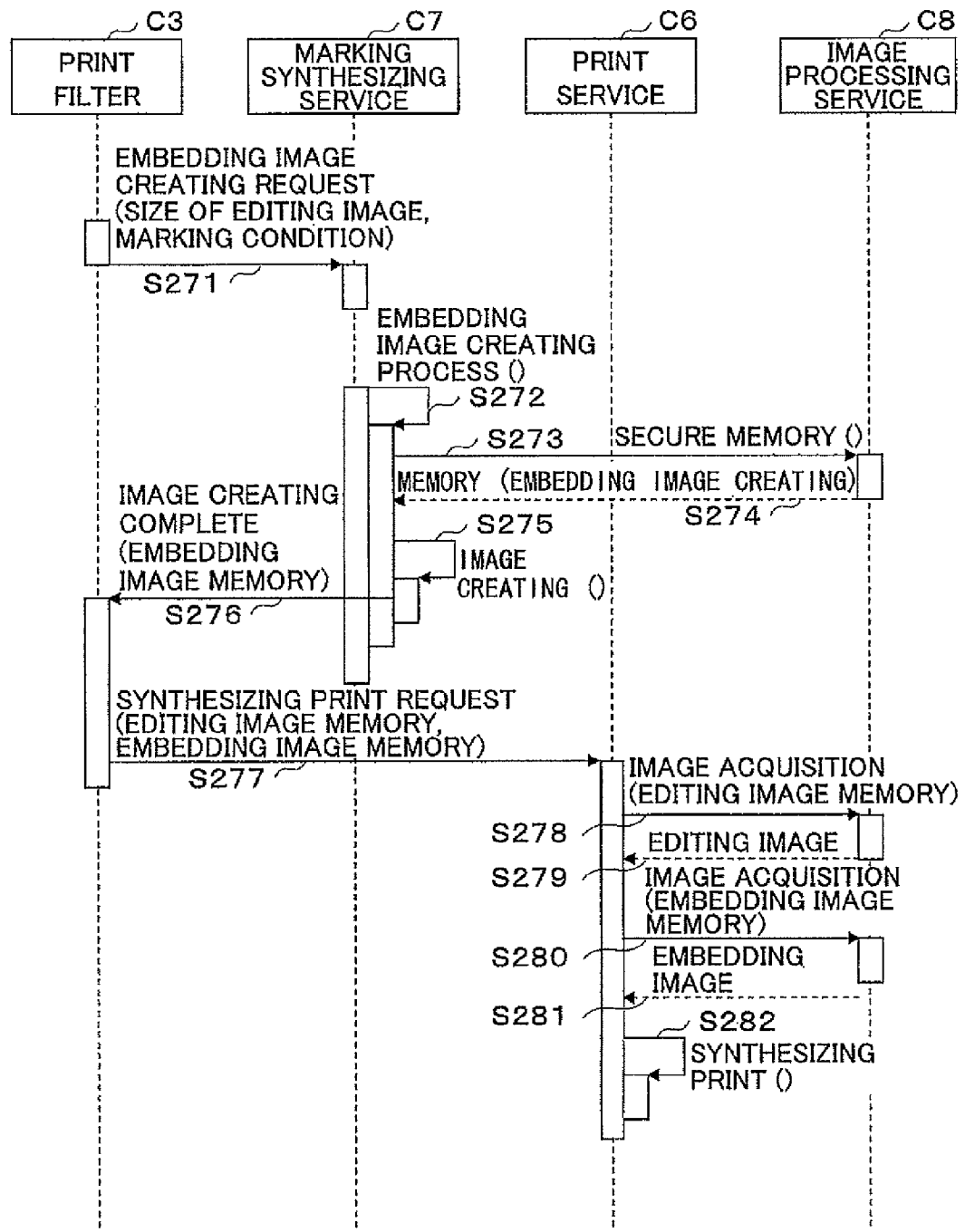
FIG. 23 is a sequence diagram showing an example of a synthesizing print process.

FIG. 23 is a sequence diagram showing an example of a synthesizing print process (corresponding to step S215 in FIG. 20, and steps S235, S238 and S241 in FIG. 21).

In FIG. 23, the print filter C3 makes an embedding image creating request to the marking synthesizing service C7 in conjunction with the side of the editing image and the marking condition (step S271).

In response to the embedding image creating request, the marking synthesizing service C7 starts an embedding image creating process (step S272), and requests the image processing service C8 to secure a memory (step S273), and acquires an embedding image memory (step S274). Then, the marking synthesizing service C7 creates the embedding image (step S275), and notifies completion of the embedding image creation to the print filter C3 by specifying the embedding image memory (step S276).

Next, the print filter C3 makes out a synthesizing print request to the print service C6 by specifying the editing image memory and the embedding image memory (step S277). In response to the synthesizing print request, the print service C6 makes an image acquisition request to the image processing service C8 by specifying the editing image memory (step S278), and acquires the editing image (step S279). In addition, the print service C6 makes an image acquisition request to the image processing service C8 by specifying the embedding image memory (step S280), and acquires the embedding image (step S281). The print service C6 performs a synthesizing print which synthesizes the acquired editing image and embedding image and prints the synthesized image (step S282).

Figure 24:
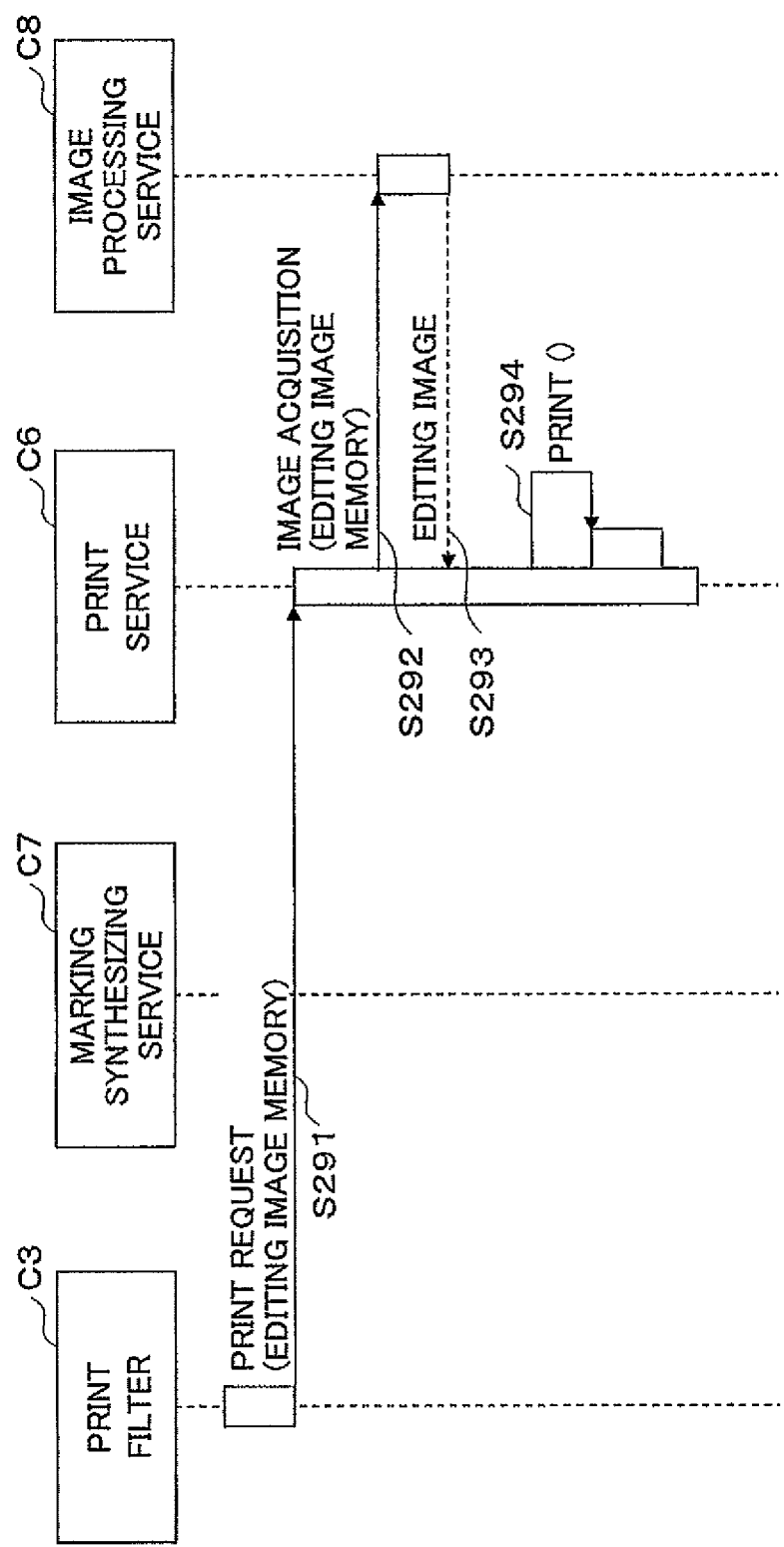
FIG. 24 is a sequence diagram showing an example of a print process.

FIG. 24 is a sequence diagram showing an example of a print process (corresponding to steps S218 and S221 in FIG. 20, and steps S255, S258 and S261 in FIG. 22).

In FIG. 24, the print filter C3 makes a print request to the print service C6 by specifying the edit image memory (step S291). In response to the print request, the print service C6 makes an image acquisition request to the image processing service C8 by specifying the editing image memory (step S292), and acquires the editing image (step S293). The print service C6 performs a print based on the acquired editing image (step S294).

FIG. 25 is a sequence diagram showing an example of the memory release process (corresponding to step S223 in FIG. 20, step S243 in FIG. 21, and step S263 in FIG. 22).

In FIG. 25, when the embedding image is used, the print filter C3 makes a memory release request to the marking synthesizing service C7 by specifying the embedding image memory (step S295). In response to the memory release request, the marking synthesizing service C7 makes a memory release request to the image processing service C8 by specifying the embedding image memory (step S296). As a result, the embedding image memory is released.

In addition, the print filter C3 makes a memory release request to the print service C6 by specifying the editing image memory (step S297). In response to the memory release request, the print service C6 makes a memory release request to the image processing service C8 by specifying the editing image memory (step S298). As a result, the editing image memory is released.

Therefore, the following advantageous features are obtainable according to this second embodiment.

(1) By preparing an interface (I/F) for synthesizing the marking in the print filter, the marking can be embedded when a new activity simply adds the print filter to the pipe and filter structure.

(2) By encapsulating knowledge which determines the marking synthesizing image and the synthesizing method within the marking synthesizing service, and making the print filter simply follow the instruction of the marking synthesizing service, new marking information can be added without making considerable (or extensive) modifications to the print filter when synthesizing the marking information (3) by determining the marking type according to the initial setting of the image processing apparatus, the operation (or running) method of the image processing apparatus can be unified with respect to the marking.

(4) By making the initial setting of the image processing apparatus "no embedding", the marking method can be changed depending on the printing material.

(5) By making a plurality of marking functions installable in the print filter and the image processing apparatus, the number of times the installing must be made can be reduced to avoid troublesome installing operations.

This application claims the benefit of a Japanese Patent Application No. 2007-284200 filed Oct. 31, 2007, in the Japanese Patent Office, the disclosure of which is hereby incorporated by reference.

Further, the present invention is not limited to these embodiments, but various variations and modifications may be made without departing from the scope of the present invention.

What is claimed is:

1. An image processing apparatus comprising:

one or a plurality of input parts configured to input data which is a target of an image processing;

one or a plurality of output parts configured to output a result of the image processing;

one or a plurality of first filters configured to control an input process of data from the one or plurality of input parts depending on the one or plurality of input parts;

one or a plurality of second filters configured to control an output of data to the one or plurality of output parts depending on the one or plurality of output parts;

one or a plurality of pipes to which the data is written by the one or plurality of first filters and from which the data is read by the one or plurality of second filters, wherein an application to execute the image processing is formed by coupling a selected first filter selected from the one or plurality of first filters and a selected second filter selected from the one or plurality of second filters, via a selected pipe that is selected from the one or plurality of pipes depending on the selected first filter and the selected second filter, and wherein the selected first filter and the selected second filter are independent of each other and no dependency relationship exists therebetween;

a marking type specifying unit configured to specify marking type information which is to be added to a predetermined image, with respect to the one or plurality of second filters;

a marking synthesizing service including a creating unit configured to create a marking image based on the marking type information which is notified thereto;

an output service including an output unit configured to synthesize the marking image created by the marking synthesizing service with respect to an image which is output from the output service, and outputting a synthesized image;

a notifying unit, within the selected second filter, configured to notify the marking type information input thereto to the marking synthesizing service; and an image output instructing unit, within the selected second filter, configured to instruct output of an image with respect to the output service.

2. The image processing apparatus as claimed in claim 1, wherein:

the marking synthesizing service includes a determination unit configured to determine a page for which the marking image is to be created, based on the marking type information notified thereto; and the one or plurality of second filters make a marking image synthesizing request to the output service to synthesize the marking image and the image which is to be output, based on a determination made by the determination unit.

3. The image processing apparatus as claimed in claim 1, wherein:

the one or plurality of second filters include an inquiring unit configured to inquire marking setting information to a setting information service which manages an initial setting of the image processing apparatus when the marking type information is input from the marking type specifying unit; and the one or plurality of second filters determine a marking type based on the marking setting information acquired from the setting information service.

4. The image processing apparatus as claimed in claim 3, wherein the one or plurality of second filters determine the marking type in accordance with a setting of the setting information service regardless of the marking type information specified from the marking type specifying unit when a setting other than no embedding is set in the setting information service.

5. The image processing apparatus as claimed in claim 3, wherein the one or plurality of second filters determine the marking type in accordance with the marking type information specified from the marking type specifying unit when no setting is set in the setting information service.

6. The image processing apparatus as claimed in claim 1, wherein the marking type information at least includes an unauthorized copy guard, a refresh copy, and a security trace.

7. A non-transitory computer-readable storage medium that stores a program which, when executed by a computer, causes the computer to perform a process of an image processing apparatus comprising one or a plurality of input parts inputting data which is a target of an image processing, one or a plurality of output parts outputting a result of the image processing, one or a plurality of first filters controlling an input process of data from the one or plurality of input parts depending on the one or plurality of input parts; one or a plurality of second filters controlling an output of data to the one or plurality of output parts depending on the one or plurality of output parts; and one or a plurality of pipes to which the data is written by the one or plurality of first filters and from which the data is read by the one or plurality of second filters, said process comprising:

forming an application to execute the image processing by coupling a selected first filter selected from the one or plurality of first filters and a selected second filter selected from the one or plurality of second filters, via a selected pipe that is selected from the one or plurality of pipes depending on the selected first filter and the selected second filter, wherein the selected first filter and the selected second filter are independent of each other and no dependency relationship exists therebetween, specifying, from a marking type specifying part, marking type information which is to be added to a predetermined image with respect to the one or plurality of second filters;

notifying, from the selected second filter, the specified marking type information to a marking synthesizing service;

creating, in the marking synthesizing service, a marking image based on the notified marking type information;

instructing, from the selected second filter, output of an image with respect to an output service; and synthesizing, in the output service, the marking image created by the marking synthesizing service with respect to the image to be output, and outputting a synthesized image.

8. The non-transitory computer-readable storage medium as claimed in claim 7, wherein the process further comprises:

determining, in the marking synthesizing service, a page for which the marking image is to be created, based on the notified marking type information; and making, from the one or plurality of second filters, a marking image synthesizing request to the output service to synthesize the marking image and the image which is to be output, based on a determination made by said determining.

9. The non-transitory computer-readable storage medium as claimed in claim 7, wherein the process further comprises:

inquiring, from the one or plurality of second filters, marking setting information to a setting information service which manages an initial setting of the image processing apparatus when the marking type information is notified; and determining, in the one or plurality of second filters, a marking type based on the marking setting information acquired from the setting information service.

10. The non-transitory computer-readable storage medium as claimed in claim 9, wherein said determining determines, in the one or plurality of second filters, the marking type in accordance with a setting of the setting information service regardless of the notified marking type information when a setting other than no embedding is set in the setting information service.

11. The non-transitory computer-readable storage medium as claimed in claim 9, wherein said determining determines, in the one or plurality of second filters, the marking type in accordance with the notified marking type information when no setting is set in the setting information service.

12. The non-transitory computer-readable storage medium as claimed in claim 7, wherein the marking type information at least includes an unauthorized copy guard, a refresh copy, and a security trace.

13. The image processing apparatus as claimed in claim 1, wherein the application is installable and uninstallable in units of the one or plurality of first filters and the one or plurality of second filters.

14. The non-transitory computer-readable storage medium as claimed in claim 7, wherein the application is installable and uninstallable in units of the one or plurality of first filters and the one or plurality of second filters.

15. An image processing apparatus comprising:

one or a plurality of input parts configured to input data which is a target of an image processing;

one or a plurality of output parts configured to output a result of the image processing;

one or a plurality of first filters configured to control an input process of data from the one or plurality of input parts depending on the one or plurality of input parts;

one or a plurality of second filters configured to control an output of data to the one or plurality of output parts depending on the one or plurality of output parts;

one or a plurality of pipes to which the data is written by the one or plurality of first filters and from which the data is read by the one or plurality of second filters, wherein an application to execute the image processing is formed by coupling a selected first filter selected from the one or plurality of first filters and a selected second filter selected from the one or plurality of second filters, via a selected pipe that is selected from the one or plurality of pipes depending on the selected first filter and the selected second filter, and wherein the selected first filter and the selected second filter are independent of each other;

a marking type specifying unit configured to specify marking type information which is to be added to a predetermined image, with respect to the one or plurality of second filters;

a marking synthesizing service including a creating unit configured to create a marking image based on the marking type information which is notified thereto;

an output service including an output unit configured to synthesize the marking image created by the marking synthesizing service with respect to an image which is output from the output service, and outputting a synthesized image;

a notifying unit, within the selected second filter, configured to notify the marking type information input thereto to the marking synthesizing service; and an image output instructing unit, within the selected second filter, configured to instruct output of an image with respect to the output service, wherein an application is installable and uninstallable in units of the one or plurality of first filters and the one or plurality of second filters.

* * * * *